(12) United States Patent
Djamgoz et al.

(10) Patent No.: US 12,508,260 B2
(45) Date of Patent: Dec. 30, 2025

(54) COMBINATION TREATMENTS

(71) Applicant: Celex Oncology Innovations Limited, London (GB)

(72) Inventors: Mustafa Bilgin Ali Djamgoz, London (GB); Carsten Faltum, London (GB)

(73) Assignee: Celex Oncology Innovations Limited, London (GB)

( * ) Notice: Subject to any disclaimer, the term of this patent is extended or adjusted under 35 U.S.C. 154(b) by 888 days.

(21) Appl. No.: 17/771,274

(22) PCT Filed: Oct. 23, 2020

(86) PCT No.: PCT/EP2020/079971
§ 371 (c)(1),
(2) Date: Apr. 22, 2022

(87) PCT Pub. No.: WO2021/078987
PCT Pub. Date: Apr. 29, 2021

(65) Prior Publication Data
US 2022/0347172 A1    Nov. 3, 2022

(30) Foreign Application Priority Data
Oct. 24, 2019 (EP) .................................... 19205075

(51) Int. Cl.
| | |
|---|---|
| *A61K 31/495* | (2006.01) |
| *A61K 31/428* | (2006.01) |
| *A61K 31/4965* | (2006.01) |
| *A61K 31/506* | (2006.01) |
| *A61K 31/517* | (2006.01) |
| *A61K 31/5377* | (2006.01) |
| *A61K 31/553* | (2006.01) |
| *A61K 31/7048* | (2006.01) |
| *A61K 45/06* | (2006.01) |
| *A61P 35/04* | (2006.01) |

(52) U.S. Cl.
CPC .......... *A61K 31/495* (2013.01); *A61K 31/428* (2013.01); *A61K 31/4965* (2013.01); *A61K 31/506* (2013.01); *A61K 31/517* (2013.01); *A61K 31/5377* (2013.01); *A61K 31/553* (2013.01); *A61K 31/7048* (2013.01); *A61K 45/06* (2013.01); *A61P 35/04* (2018.01)

(58) Field of Classification Search
CPC ................ A61K 31/495; A61K 31/428; A61K 31/4965; A61K 31/506; A61K 31/517; A61K 31/5377; A61K 31/553; A61K 31/7048; A61K 45/06; A61P 35/04; A61P 35/00
See application file for complete search history.

(56) References Cited

U.S. PATENT DOCUMENTS

| | | | |
|---|---|---|---|
| 2008/0207657 A1 | 8/2008 | Black et al. | |
| 2013/0203764 A1* | 8/2013 | Djamgoz | ................ A61P 15/00 514/367 |
| 2015/0045305 A1* | 2/2015 | Belardinelli | .............. A61P 9/06 514/17.4 |
| 2018/0346431 A1 | 12/2018 | Djamgoz | |
| 2020/0123544 A1 | 4/2020 | Djamgoz | |

FOREIGN PATENT DOCUMENTS

| | | |
|---|---|---|
| EP | 2 278 025 A1 | 1/2011 |
| EP | 2 394 646 | 12/2011 |
| WO | WO 2009/119502 A1 | 10/2009 |
| WO | WO 2012/049440 A1 | 4/2012 |
| WO | WO 2018/146313 A1 | 8/2018 |

OTHER PUBLICATIONS

DailyMed-Ranexa, https://dailymed.nlm.nih.gov/dailymed/drugInfo.cfm?setid=4299062a-b208-4e08-93ec-a05894541c07; accessed Mar. 26, 2025; last updated Jul. 27, 2016 (Year: 2016).*
Kale, et al.; Biochimica et Biophysica Acta, v1848, pp. 2747-2755; 2015 (Year: 2015).*
Koltai, T.; F1000Research, v4:297, pp. 1-16; 2015 (Year: 2015).*
Singh, et al.; Mini-Reviews in Medicinal Chemistry, v16, pp. 1134-1106; 2016 (Year: 2016).*
DailyMed website for Ranexa, accessed on Mar. 26, 2025; https://dailymed.nlm.nih.gov/dailymed/drugInfo.cfm?setid=4299062a-b208-4e08-93ec-a05894541c07; updated Jul. 27, 2016 (p. 1) (Year: 2016).*
Rilutek Prescribing Information, Covis Pharmaceuticals, Issued Apr. 2016 (Year: 2016).*
Brackenbury, W. J.; Channels, v6, pp. 352-361; 2012 (Year: 2012).*
Antzelevitch, C., et al., "Electrophysiologic Effects of Ranolazine. A Novel Anti-Anginal Agent with Antiarrhythmic Properties," *Circulation*, 2004, vol. 110(8), pp. 904-910.
Brackenbury, William J., "Voltage-gated sodium channels and metastatic disease," *Channels*, 2012, vol. 6(5), pp. 352-361.
Campbell, T., et al., "Functional expression of the voltage-gated $Na^+$-channel $NA_v1.7$ is necessary for EGF-mediated invasion in human non-small cell lung cancer cells," *Journal of Cell Science*, 2013, vol. 126(21), pp. 4939-4949.
Chioni, A, et al., "A novel polyclonal antibody specific for the $NA_v1.5$ voltage-gated $NA^+$ channel 'neonatal' splice form," *Journal of Neuroscience Methods*, 2005, vol. 147, pp. 88-98.
Diss, J., et al., "Expression Profiles of Voltage-Gated $Na^+$ Channel α-Subunit Genes in Rat and Human Prostate Cancer Cell Lines," *The Prostate*, 2001, vol. 48(3), pp. 165-178.

(Continued)

*Primary Examiner* — Jeffrey S Lundgren
*Assistant Examiner* — W. Justin Youngblood
(74) *Attorney, Agent, or Firm* — Womble Bond Dickinson (US) LLP

(57) ABSTRACT

Combinations of a voltage-gated sodium channel (VGSC) blocker and at least one other substance that directly or indirectly modulate ionic mechanisms, e.g., a potassium channel opener, sodium influx inhibitor or upstream downregulator of VGSC expression, for treating or preventing cancer, including reducing, preventing or inhibiting metastatic and/or invasive behaviour of the cancer.

Figure 2:
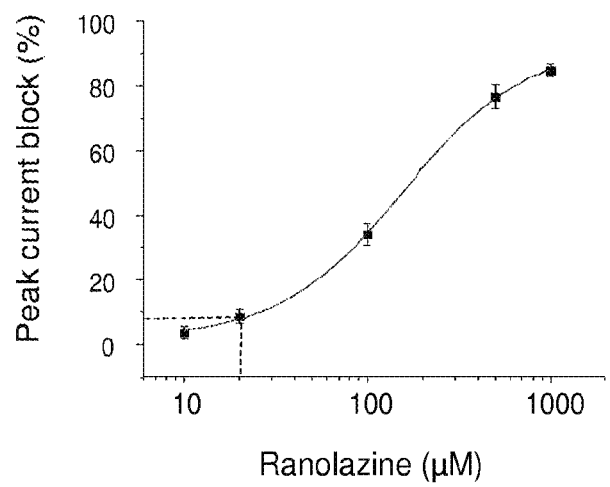

12 Claims, 12 Drawing Sheets
Specification includes a Sequence Listing.

(56) References Cited

OTHER PUBLICATIONS

Diss, J., et al., "A potential novel marker for human prostate cancer: voltage-gated sodium channel expression in vivo," *Prostate Cancer and Prostatic Diseases*, 2005, vol. 8, pp. 266-273.

Djamgoz, Mustafa B. A., "Biophysics of Cancer: Cellular Excitability ("CELEX") Hypothesis of Metastasis," *J. Clin Exp Oncol*, 2014, S1, pp. 1-7.

Djamgoz, et al., "In Vivo Evidence for Voltage-Gated Sodium Channel Expression in Carcinomas and Potentiation of Metastasis," *Cancers*, 2019, vol. 11(11): 1675, pp. 1-20.

Fraser, S., et al., "Contribution of Functional Voltage-Gated $Na^+$ Channel Expression to Cell Behaviors Involved in the Metastatic Cascade in Rat Prostate Cancer: I. Lateral Motility," *Journal of Cellular Physiology*, 2003, vol. 195, pp. 479-487.

Fraser, S., et al., "Voltage-Gated Sodium Channel Expression and Potentiation of Human Breast Cancer Metastasis," *Clin Cancer Res*, 2005, vol. 11(15), pp. 5381-5389 (correction, p. 8224).

Grimes, J., et al., "Differential expression of voltage-activated $Na^+$ currents in two prostatic tumour cell lines: contribution to invasiveness in vitro," *FEBS Letters*, 1995, vol. 369, pp. 290-294.

Laniado, M., et al., "Voltage-Gated $K^+$ Channel Activity in Human Prostate Cancer Cell Lines of Markedly Different Metastatic Potential: Distinguishing Characteristics of PC-3 and LNCaP Cells," *The Prostate*, 2001, vol. 46, pp. 262-274.

Laniado, M., et al., "Expression and Functional Analysis of Voltage-Activated $Na^+$ Channels in Human Prostate Cancer Cell Lines and their Contribution to Invasion in Vitro," *American Journal of Pathology*, 1997, vol. 150(4), pp. 1213-1221.

Lee, A., et al., "Propranolol inhibits neonatal Nav 1.5 activity and invasiveness of MDA- MB-231 breast cancer cells: Effects of combination with ranolazine," *Cellular Physiology*, 2019, vol. 234(12), pp. 23066-23081.

Matthews, H., et al., "Anti-tumour/metastasis effects of the potassium-sparing diuretic amiloride; an orally active anti-cancer drug waiting for its call-of-duty," *International Journal of Cancer*, 2011, vol. 129(9), pp. 2051-2061.

Onkal, R., et al., "Alternative Splicing of Nav1.5: An Electrophysiological Comparison of 'Neonatal' and 'Adult' Isoforms and Critical Involvement of a Lysine Residue," *Journal of Cellular Physiology*, 2008, vol. 216, pp. 716-726.

Roger, S., et al., "Voltage-gated sodium channels and cancer: is excitability their primary role?" *Frontiers in Pharmacology*, 2015, vol. 6(152), pp. 1-23.

Uysal-Onganer, P, et anan, "Epidermal growth factor potentiates in vitro metastatic behavior of human prostate cancer PC-3M cells: involvement of voltage-gated sodium channel," *Molecular Cancer*, 2007, vol. 6(76), pp. 1-12.

Mullin, C., et al., "Monoxidil Inhibits The Metastatic Phenotype Of Osteosarcoma," *J. Vet. Intern. Med.* (2015), vol. 29(4), p. 1169(018). (Abstract Only).

Yildirim, S., et al., "Voltage-gated sodium channel activity promotes prostate cancer metastasis in vivo," *Cancer Letters*, 2012, vol. 323, pp. 58-61.

\* cited by examiner a) SCN5A (Nav1.5)

Nav1.5 amino acid sequence comparison

'Neonatal' (5'):   YVSENIKLGNLSALRTFRVLRALKTISVIP

'Adult' (3'):      YTTEFVDLGNVSALRTFRVLRALKTISVIS b) SCN8A (Nav1.6)

Nav1.6 amino acid sequence comparison

'Neonatal' (5'):   YITEFVNLGNVSALRTFRVLRALKTISVIP

'Adult' (3'):      YVTEFVDLGNVSALRTFRVLRALKTISVIP c) SCN9A (Nav1.7)

Nav1.7 amino acid sequence comparison

'Neonatal' (5')    YLTEFVNLGNVSALRTFRVLRALKTISVIP

'Adult' (3')       YVTEFVDLGNVSALRTFRVLRALKTISVIP

FIG. 1 a)
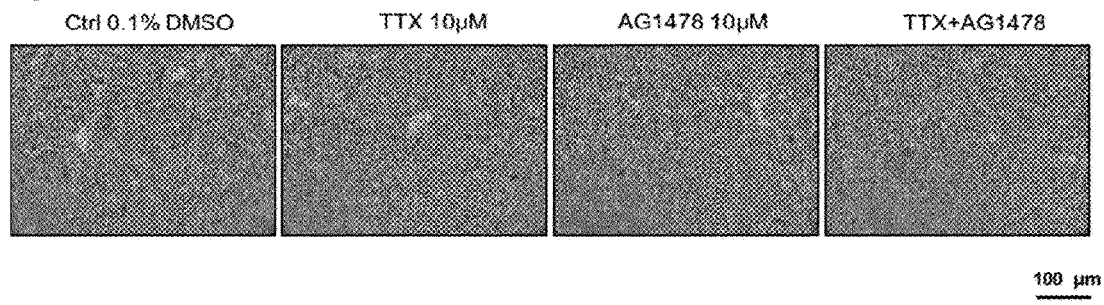
b)
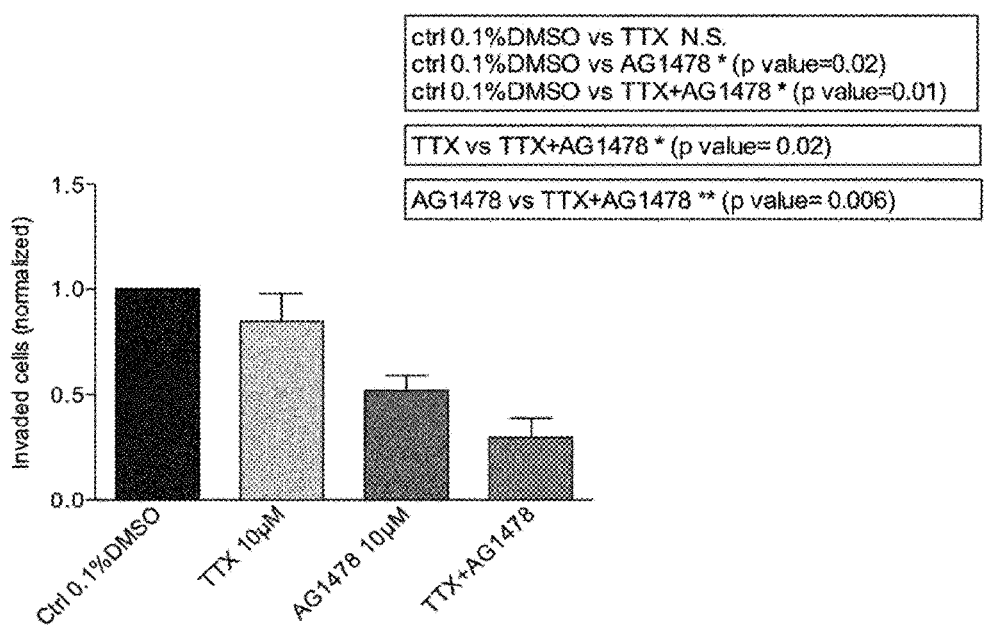
FIG. 10

SEQUENCE LISTING

```
<160> NUMBER OF SEQ ID NOS: 8

<210> SEQ ID NO 1
<211> LENGTH: 30
<212> TYPE: PRT
<213> ORGANISM: Artificial
<220> FEATURE:
<223> OTHER INFORMATION: nNav1.5 segment

<400> SEQUENCE: 1

Tyr Val Ser Glu Asn Ile Lys Leu Gly Asn Leu Ser Ala Leu Arg Thr
1               5                   10                  15

Phe Arg Val Leu Arg Ala Leu Lys Thr Ile Ser Val Ile Pro
            20                  25                  30

<210> SEQ ID NO 2
<211> LENGTH: 30
<212> TYPE: PRT
<213> ORGANISM: Artificial
<220> FEATURE:
<223> OTHER INFORMATION: aNav1.5 segment

<400> SEQUENCE: 2

Tyr Thr Thr Glu Phe Val Asp Leu Gly Asn Val Ser Ala Leu Arg Thr
1               5                   10                  15

Phe Arg Val Leu Arg Ala Leu Lys Thr Ile Ser Val Ile Ser
            20                  25                  30

<210> SEQ ID NO 3
<211> LENGTH: 30
<212> TYPE: PRT
<213> ORGANISM: Artificial
<220> FEATURE:
<223> OTHER INFORMATION: nNav1.6 segment

<400> SEQUENCE: 3

Tyr Ile Thr Glu Phe Val Asn Leu Gly Asn Val Ser Ala Leu Arg Thr
1               5                   10                  15

Phe Arg Val Leu Arg Ala Leu Lys Thr Ile Ser Val Ile Pro
            20                  25                  30

<210> SEQ ID NO 4
<211> LENGTH: 30
<212> TYPE: PRT
<213> ORGANISM: Artificial
<220> FEATURE:
<223> OTHER INFORMATION: aNav1.6 segment

<400> SEQUENCE: 4

Tyr Val Thr Glu Phe Val Asp Leu Gly Asn Val Ser Ala Leu Arg Thr
1               5                   10                  15

Phe Arg Val Leu Arg Ala Leu Lys Thr Ile Ser Val Ile Pro
            20                  25                  30

<210> SEQ ID NO 5
```

```
<211> LENGTH: 30
<212> TYPE: PRT
<213> ORGANISM: Artificial
<220> FEATURE:
<223> OTHER INFORMATION: nNav1.7 segment

<400> SEQUENCE: 5

Tyr Leu Thr Glu Phe Val Asn Leu Gly Asn Val Ser Ala Leu Arg Thr
1               5                   10                  15

Phe Arg Val Leu Arg Ala Leu Lys Thr Ile Ser Val Ile Pro
            20                  25                  30

<210> SEQ ID NO 6
<211> LENGTH: 30
<212> TYPE: PRT
<213> ORGANISM: Artificial
<220> FEATURE:
<223> OTHER INFORMATION: aNav1.7 segment

<400> SEQUENCE: 6

Tyr Val Thr Glu Phe Val Asp Leu Gly Asn Val Ser Ala Leu Arg Thr
1               5                   10                  15

Phe Arg Val Leu Arg Ala Leu Lys Thr Ile Ser Val Ile Pro
            20                  25                  30

<210> SEQ ID NO 7
<211> LENGTH: 6
<212> TYPE: PRT
<213> ORGANISM: Artificial
<220> FEATURE:
<223> OTHER INFORMATION: residues 206-211 of aNav1.5

<400> SEQUENCE: 7

Thr Thr Glu Phe Val Asp
1               5

<210> SEQ ID NO 8
<211> LENGTH: 6
<212> TYPE: PRT
<213> ORGANISM: Artificial
<220> FEATURE:
<223> OTHER INFORMATION: residues 206-211 in nNav1.5

<400> SEQUENCE: 8

Val Ser Glu Asn Ile Lys
1               5
```

COMBINATION TREATMENTS

CROSS-REFERENCE TO RELATED APPLICATIONS

This application is a national stage filing under 35 U.S.C. 371 of PCT/EP2020/079971 filed Oct. 23, 2020, which was published by the International Bureau in English on Apr. 29, 2021, and which claims priority from European Application No 19205075.5, filed Oct. 24, 2019, each of which is hereby incorporated in its entirety by reference in this application.

REFERENCE TO A SEQUENCE LISTING SUBMITTED ELECTRONICALLY AS AN ASCII FILE

The instant application contains a Sequence Listing which has been submitted in ASCII format and is hereby incorporated by reference in its entirety. Said ASCII copy, created on Sep. 11, 2025, is named I88449 1480US 0073 3 ST25 Sequence Listing, and is 4,096 bytes in size.

FIELD OF THE INVENTION

The present invention relates to cancer therapy, particularly using a combination of a voltage-gated sodium channel (VGSC) blocker and at least one second substance, such as a potassium channel opener, other sodium influx inhibitor and/or an upstream down-regulator of VGSC expression.

BACKGROUND OF THE INVENTION

Voltage-gated sodium channels (VGSCs) are integral membrane proteins containing a pore-forming alpha subunit and smaller non-pore-forming beta subunits, conducting sodium ions ($Na^+$) through a cell's plasma membrane. In humans, there are nine different VGSC alpha subunits or "Nav" proteins (Nav1.1 to Nav1.9), encoded by the genes SCN1A, SCN2A, SCN3A, SCN4A, SCN5A, SCN8A, SCN9A, SCN10A, and SCN11A respectively. The alpha subunit of VGSCs is a transmembrane protein with 4 repetitive transmembrane domains (termed DI, DII, DIII, and DIV), which each contains 6 transmembrane spanning sections that are termed S1-S6. $Na^+$ ions flow through a pore formed by S5 and S6 of all 4 domains. The S4 segment plays a central role in voltage sensing. The smaller beta subunits contain an N-terminal extracellular immunoglobulin (Ig) loop, a transmembrane domain and an intracellular domain.

VGSCs are expressed in metastatic cells from a number of cancers, potentiating invasive and metastatic behaviour (Brackenbury, 2012; Roger et al., 2015; Djamgoz et al., 2009; Diss et al., 2001, 2005). In some cancers, the dominant VGSC expressed is a neonatal splice variant of a VGSC.

For example, more than 10 different splice isoforms have been described for SCN5A (Nav1.5), of which several harbour different functional properties, and different isoforms are expressed during neonatal and adult life. The neonatal and adult forms of the Nav1.5 protein are the results of alternative splicing of exon 6, and have several amino acid differences in, e.g., the DI: S3-S4 region of the channel protein (FIG. 1). In particular, at position 211, the conserved aspartate (Asp or D) residue (negative) in adult Nav1.5 is switches to a lysine (Lys or K) residue (positive) in neonatal Nav1.5.

Human Nav1.7 is encoded by the gene SCN9A. The neonatal form of Nav1.7 (nNav1.7) is a splice variant of exon 6, similar to nNav1.5, resulting, e.g., in the amino acid aligning with residue 211 of human Nav1.5 being switched from a conserved aspartate (Asp or D) in all VGSCs (Nav1.1-Nav1.9) to an asparagine (Asn or N).

Human Nav1.6 is encoded by the gene SCN8A. The neonatal form is spliced similar to Nav1.7 (i.e., a D to N substitution in the residue aligning with residue 211 in Nav1.5).

WO 2012/049440 (Celex Oncology Ltd.) relates to methods of inhibiting or reducing metastatic behaviour in cancer by administering ranolazine or riluzole.

WO 2018/146313 (Celex GmbH) relates to relates to methods of inhibiting or reducing metastatic behaviour in cancer by administering eleclazine.

However, there remains a need for improved methods of treating cancer, including methods that prevent, reduce or inhibit metastatic and/or invasive behaviour of tumour cells.

SUMMARY OF THE INVENTION

It has been found by the present inventors that combinations of VGSC blockers, particularly VGSC persistent current blockers, and various other substances that directly or indirectly modulate ionic mechanisms, including potassium channel openers, other sodium influx inhibitors and upstream down-regulators of VGSC expression, can be used for preventing or treating cancer. In particular, metastatic and/or invasive behaviour of the cancer or tumour cells can be prevented, reduced or inhibited. Particularly preferred are synergistic combinations.

So, in a first aspect, the invention relates to such combinations for use in a method of treating or preventing cancer in a subject, wherein the combination comprises a first substance that is a VGSC persistent current blocker and at least one second substance which is selected from a potassium channel opener, a sodium influx inhibitor and an upstream regulator of VGSC expression, or a combination thereof.

In a second aspect, the invention relates to a kit-of-parts comprising the first substance and the at least one second substance, for use in a method of treating or preventing cancer in a subject.

In a third aspect, the invention relates to a method of treating or preventing cancer in a subject, comprising administering to the subject the first substance and the at least one second substance.

In a fourth aspect, the invention relates to a pharmaceutical composition comprising as the active ingredients the first substance and the at least one second substance, in admixture with a pharmaceutically acceptable carrier, diluent, vehicle, and/or excipient.

The invention is more specifically set forth in the appended claims, with further details being provided below.

FIGURE LEGENDS

FIG. 1. Aligned segments of nNav1.5 with aNav1.5 (SEQ ID NOS: 1 and 2, respectively), nNav1.6 with aNav1.6 (SEQ ID NOS: 3 and 4, respectively), and nNav1.7 with aNav1.7 (SEQ ID NOS: 5 and 4, respectively). Residues in the 'neonatal' segment that differ from those in the corresponding positions in the 'adult' segment are underlined.

FIG. 2. Effects of ranolazine on the transient ('peak') component of VGSC current (human strongly metastatic MDA-MB-231 cells). At the concentrations used in the present Examples (<<10 UM), there is hardly any effect on the transient current.

Figure 3:
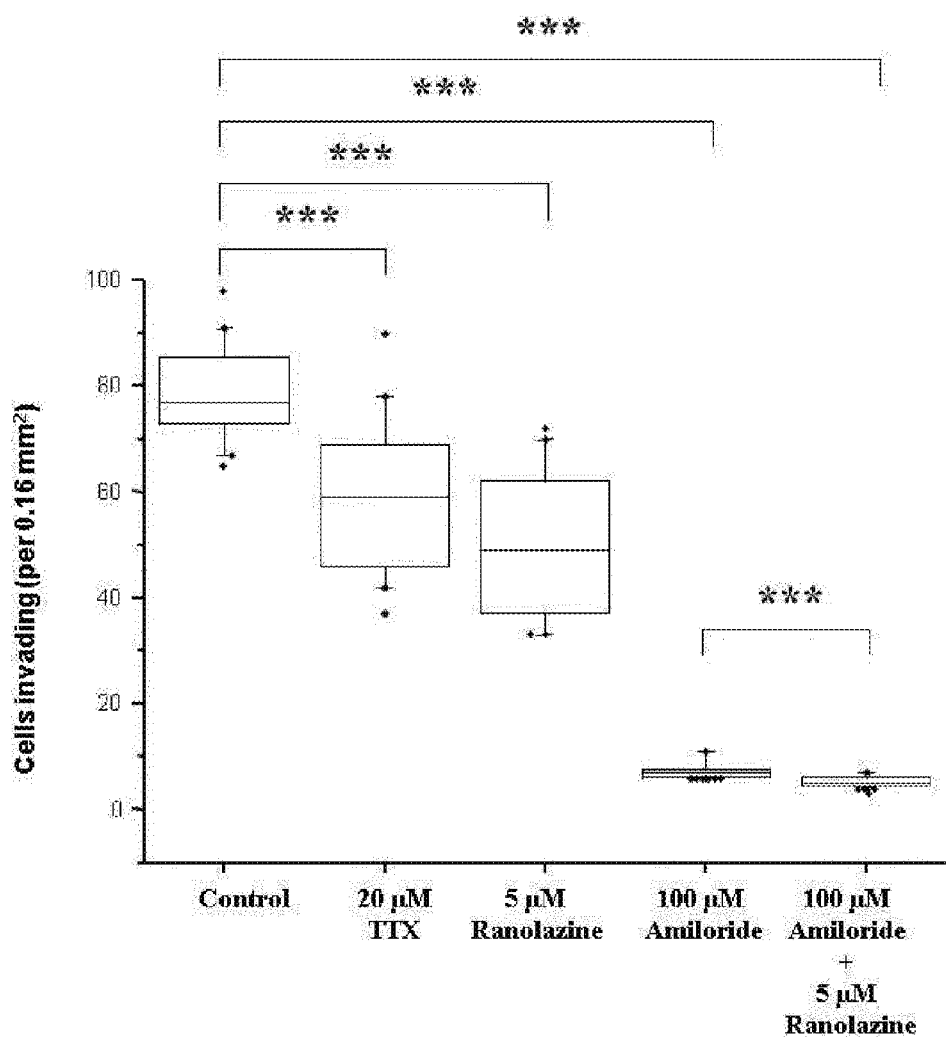

FIG. 3. Effects of tetrodotoxin (TTX), ranolazine (5 UM), amiloride (100 µM) and a combination of ranolazine and amiloride on cell invasiveness under hypoxia (1% $O_2$). A synergistic effect was observed for the combination.

Figure 4:
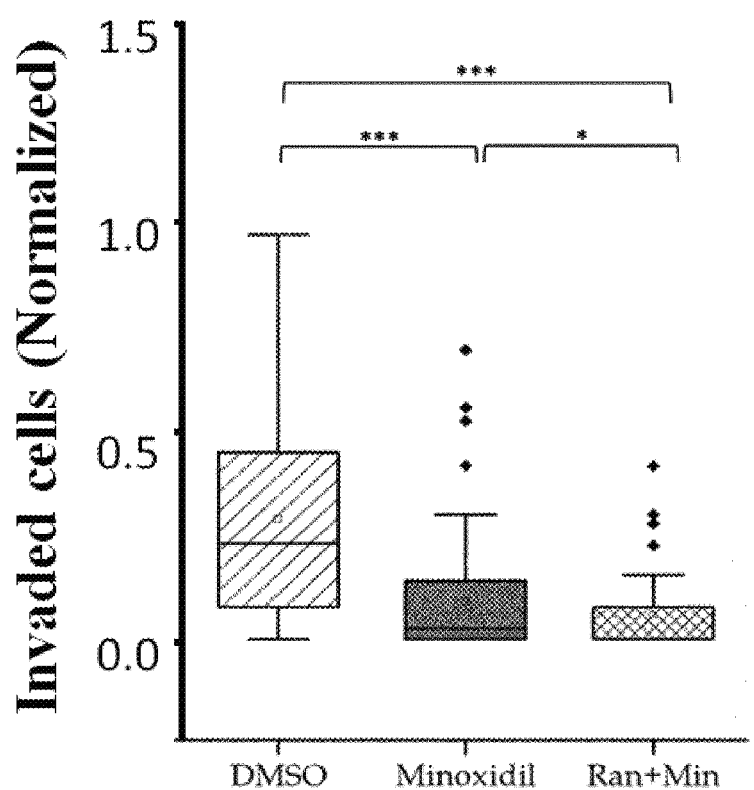

FIG. 4. Effects of DMSO, minoxidil (50 µM), or a combination of minoxidil (Min) and ranolazine (Ran) (5 µM) on cell invasiveness under hypoxia (1% $O_2$). A synergistic effect was observed for the combination.

Figure 5:
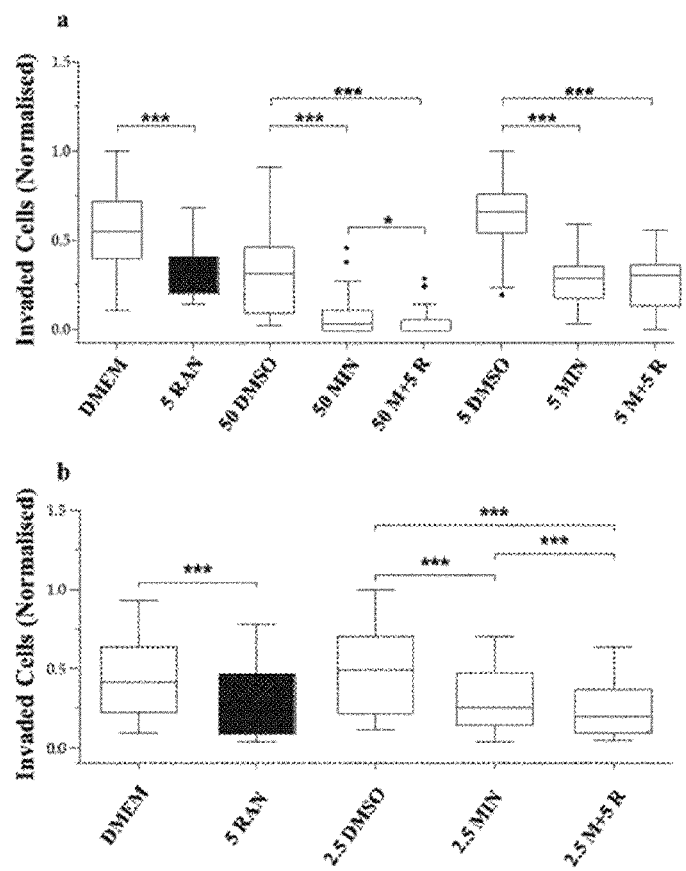

FIG. 5. Effects of ranolazine, minoxidil and drug combination treatments on invasion under hypoxia (human strongly metastatic MDA-MB-231 cells). Box plots show the effects of different concentrations of treatments. (a) (i) 5 µM ranolazine, 50 µM minoxidil and their combination and (ii) 5 µM ranolazine, 5 µM minoxidil and their combination (n=3 each). (b) 2.5 µM ranolazine and 2.5 µM minoxidil. The box plots are presented as medians, interquartile range; 5% and 95% confidence intervals and outliers. ***=$p<0.001$.

Figure 6:
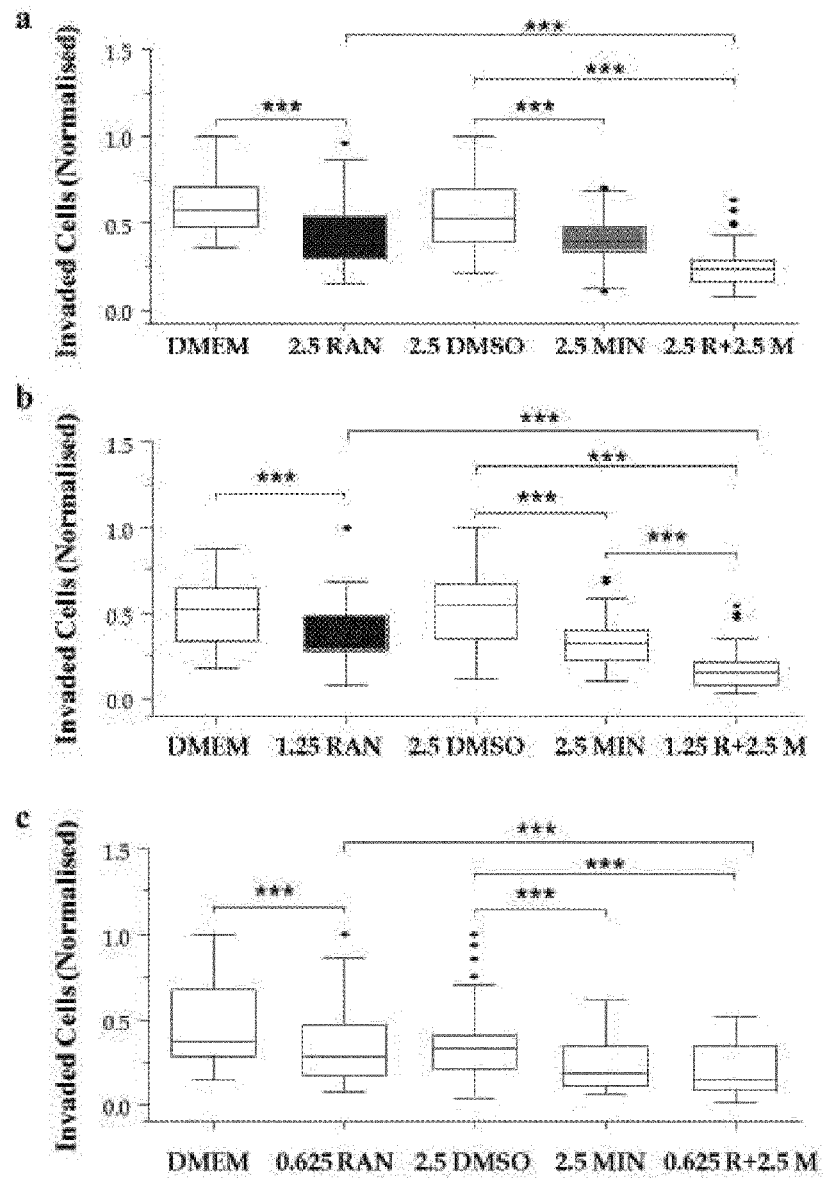

FIG. 6. Effects of ranolazine (RAN), minoxidil (MIN) over a range of concentrations and drug combination treatments on invasion under hypoxia (human strongly metastatic MDA-MB-231 cells). Box plots show the effects of (a) 2.5 µM ranolazine, 2.5 µM minoxidil and combination treatments (n=3); and (b) 1.25 µM ranolazine and 2.5 µM minoxidil and combination treatment (n=6); and (c) 0.625 µM ranolazine and 2.5 µM minoxidil and combination treatment (n=4). The box plots are presented as medians, interquartile range; 5% and 95% confidence intervals and outliers. In all cases, the effect of the combination is significantly greater than RAN alone (***=$p<0.001$).

Figure 7:
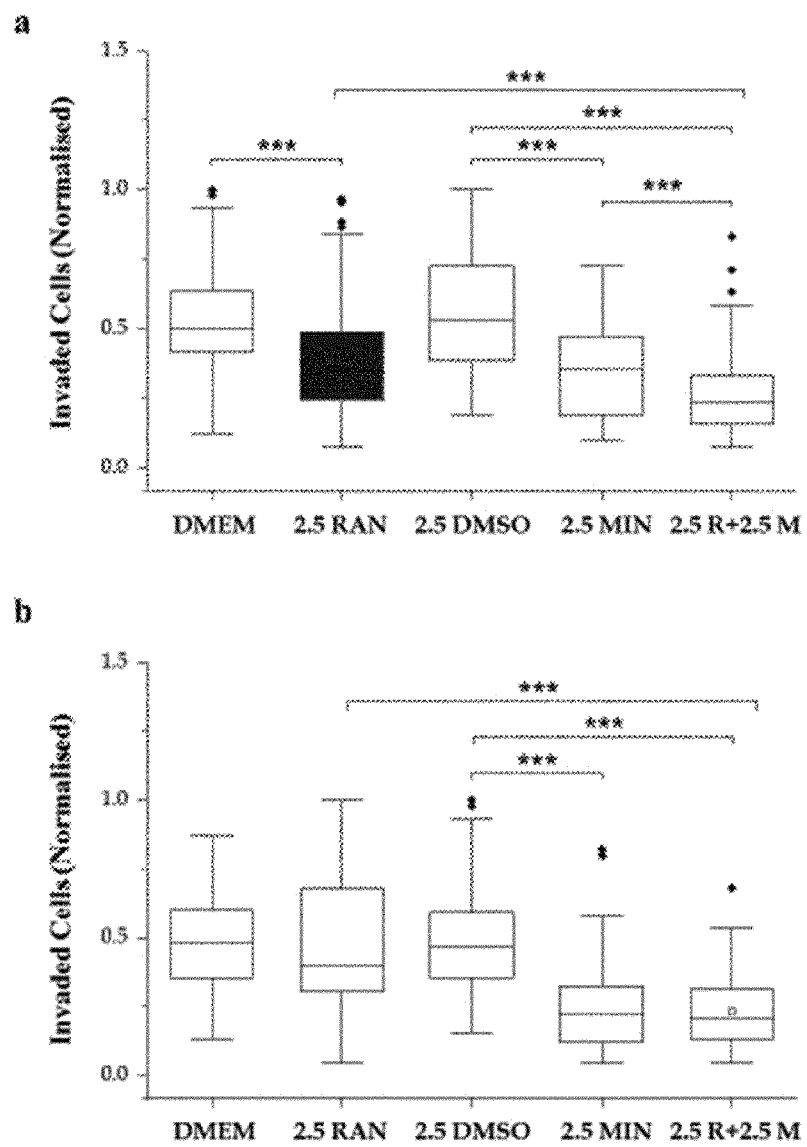

FIG. 7. Effects of ranolazine, minoxidil and drug combination treatments on invasion under hypoxia (a) and normoxia (b) (human strongly metastatic MDA-MB-231 cells). Box plots show the effects of 2.5 µM ranolazine, 2.5 µM minoxidil and their combination on cell invasiveness (n=3 each). The box plots are presented as medians, interquartile range; 5% and 95% confidence intervals and outliers. Results show that ranolazine is effective only under hypoxia and the combinations are significantly more effective than ranolazine alone (***=$p<0.001$).

Figure 8:
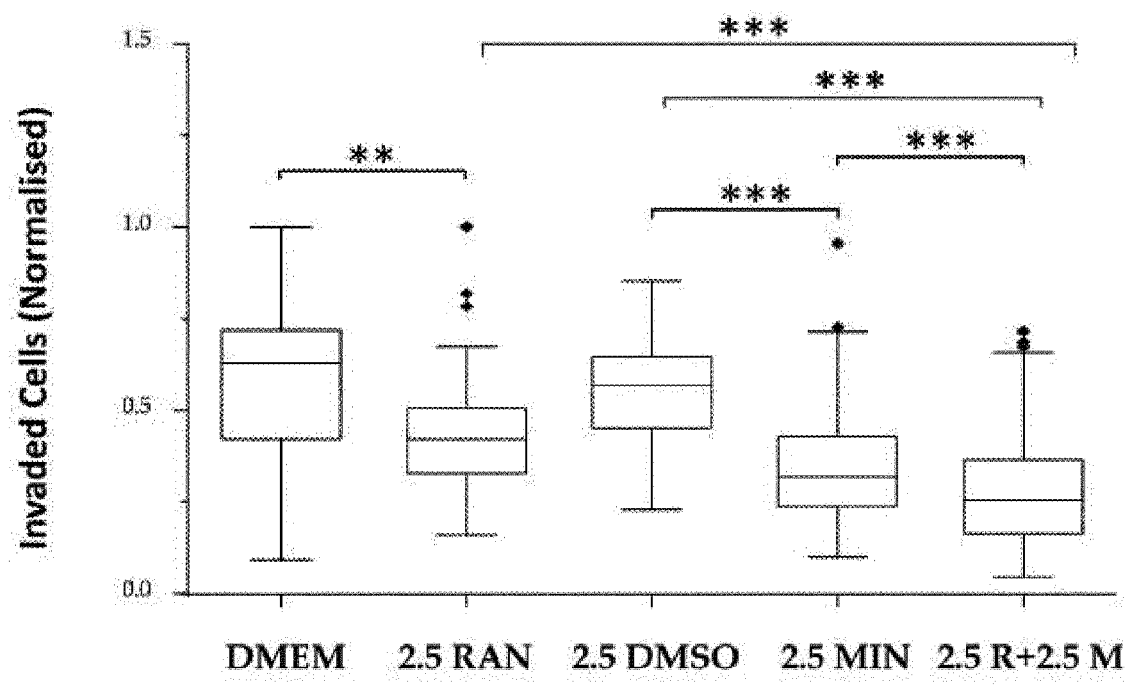

FIG. 8. Effects of ranolazine, minoxidil and their combination on the invasiveness of the moderately metastatic human breast cancer MDA-MB-468 cells under hypoxia. Box plots show the effects of 2.5 µM ranolazine, 2.5 µM minoxidil and their combination on cell invasiveness under hypoxia (n=4). The box plots are presented as medians, interquartile range; 5% and 95% confidence intervals and outliers. =$p<0.01$; *=$p<0.001$.

Figure 9:
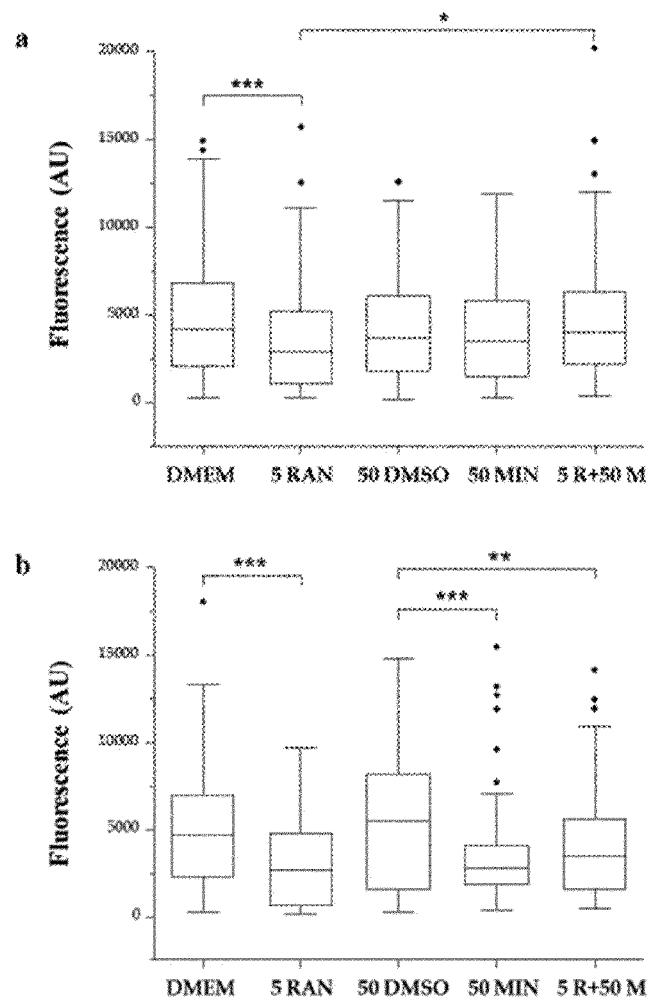

FIG. 9. Effects of ranolazine, minoxidil and drug combination treatments on nNav1,5 protein expression under hypoxia (human strongly metastatic MDA-MB-231 cells). Expression was quantified as immunofluorescence in arbitrary units (AU). Box plots showing the effect 5 µM ranolazine, 50 µM minoxidil and drug combination treatments on nNav1,5 protein expression in MDA-MB-231 cells under (a) non-permeabilized or (b) permeabilized conditions (n=134-299 cells for individual conditions). The box plots are presented as medians, interquartile range; 5% and 95% confidence intervals and outliers. Ranolazine (i) reduced the immunofluorescence in both conditions and (ii) the combination was more effective than ranolazine alone but only in non-permeabilized cells.

FIG. 10. Effects of 0.1% DMSO (control), TTX (10 µM), AG1478 (10 µM), and TTX+AG1478 on cell invasion (human strongly metastatic MDA-MB-231 cells).

Figure 11:
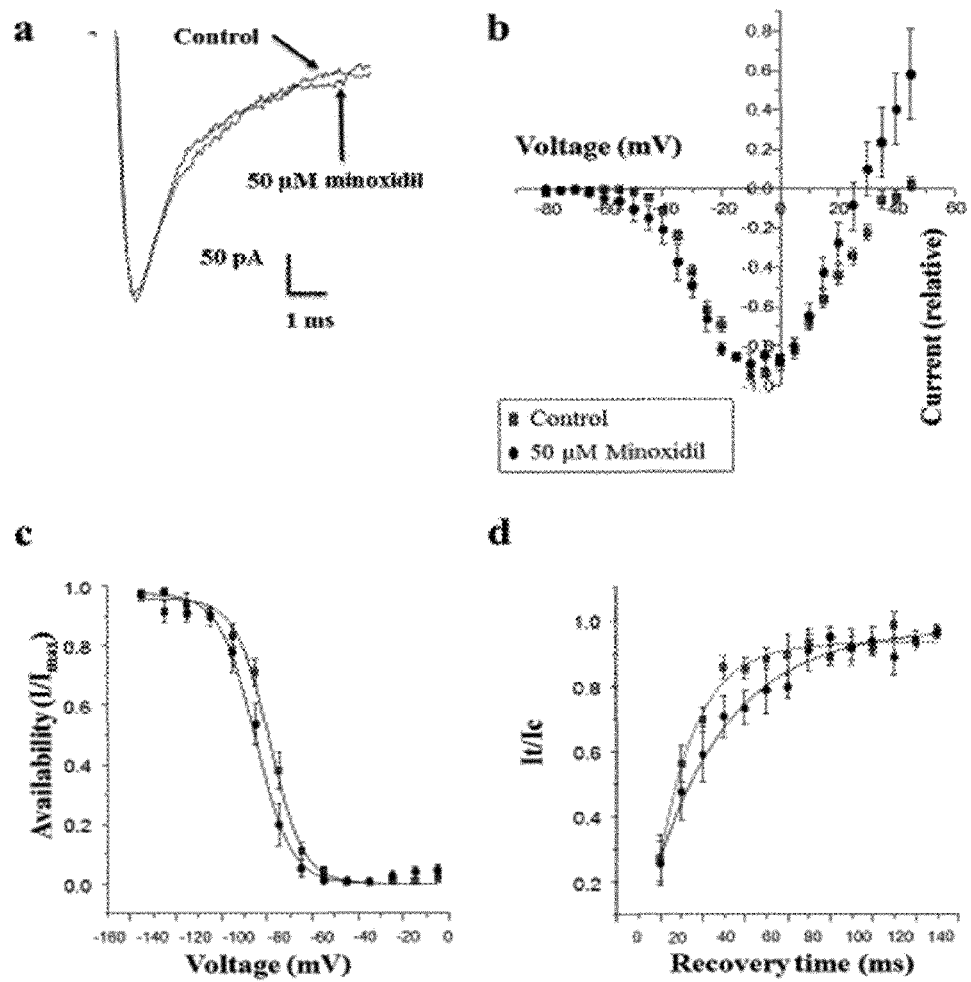

FIG. 11. Effect of an acute application of 50 µM minoxidil on the VGSC activity in MDA-MB-231 cells. (a) Effect of 50 µM minoxidil on the peak current. (b) Current-voltage relationship for control conditions and 50 µM minoxidil (n=8 and n=6, respectively). (c) Steady-state inactivation for control cells and 50 µM minoxidil (n=7 and n=5, respectively). (d) Recovery from inactivation for control cells and 50 µM minoxidil (n=7 and n=5, respectively). Inset applies to parts b-d. The data are presented as means±standard errors of the mean.

Figure 12:
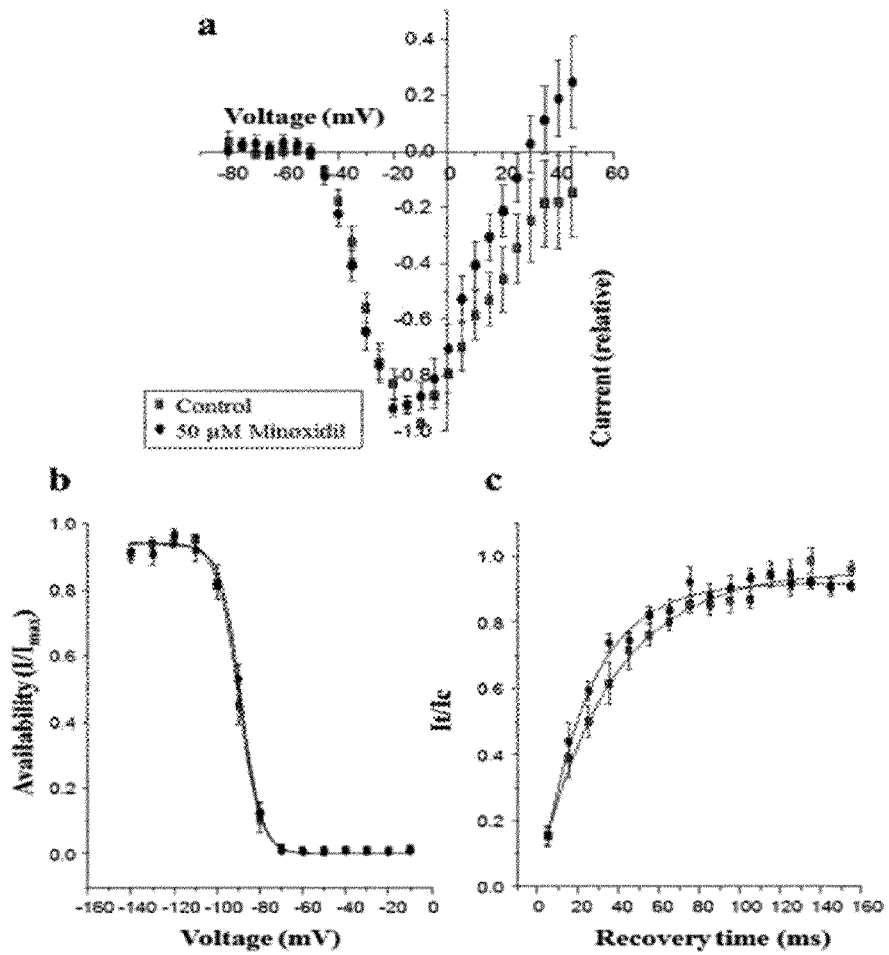

FIG. 12. Effect of a chronic (48 h) treatment with 50 µM minoxidil under hypoxia on the VGSC activity in MDA-MB-231 cells. (a) Current-voltage relationship for control conditions and 50 µM minoxidil (n=7 and n=8, respectively). (b) Steady-state inactivation for control cells and 50 µM minoxidil (n=7 and n=8, respectively). (c) Recovery from inactivation for control cells and 50 µM minoxidil (n=6 and n=7, respectively). Inset applies to all parts of the figure. The data are presented as means #standard errors of the mean.

DETAILED DISCLOSURE OF THE INVENTION

The present invention is based, at least in part, on the surprising discovery that combinations of a first substance which is a VGSC blocker, particularly a VGSC persistent current blocker, with at least one second substance that directly or indirectly modulates ionic mechanisms channels can be more effective than the individual substances in preventing, reducing or inhibiting metastatic and/or invasive behaviour of tumour cells. The second substance can, for example, be one that increases the efflux of potassium ions, reduces the influx of sodium and/or downregulates VGSC expression.

Without being limited to theory, the second substance may provide for a further reduction in the level of intracellular sodium ions in a VGSC-expressing tumour cell exposed to a VGSC persistent current blocker, thereby resulting in an even further reduction or inhibition in the metastatic and/or invasive behaviour of the tumour cell. So, opening a potassium channel may hyperpolarize the membrane potential and thus reduce the force for the VGSC to be in the inactive state; blocking a different type of sodium channel such as an epithelial sodium channel (ENaC) may further reduce the intracellular sodium levels; and blocking EGFR-TK activity may reduce the VGSC expression and thereby reduce the influx of sodium ions.

As described in the Examples, the inventors tested three different (independent) possible ways of generating synergy with VGSC/$I_{NaP}$ blockage: (i) a K⁺ ATP channel opener (minoxidil); (ii) an ENaC blocker (amiloride), as a means of controlling sodium influx into cells independently of the VGSC; and (iii) an EGFR kinase inhibitor (AG1478), to modulate mechanisms driven by EGF signalling.

The following was, for example, found with respect to a combination of the VGSC blocker ranolazine and the potassium channel opener minoxidil (see Examples 3 to 5 for details):

Matrigel® invasion in the human breast cancer (BCa) MDA-MB-231 cell line was significantly reduced in a dose-dependent manner by ranolazine under hypoxia, and by minoxidil under both normoxia and hypoxia. There was evidence of enhancement action for the drug combination under hypoxia. A similar action for ranolazine, minoxidil and the drug combination on invasion was shown under hypoxia for an additional human BCa cell line, MDA-MB-468.

Cell viability and proliferation were not affected by either drug or the combination under either hypoxia or normoxia.

'Total' nNav1.5 protein expression was significantly reduced by both drugs under hypoxia but 'plasma membrane' levels by only ranolazine.

Moreover, a combination of ranolazine and an ENaC blocker (see Example 2 for details), and a combination of the VGSC blocker TTX and an EGFR kinase inhibitor inhibited invasiveness significantly more than TTX alone (see Example 6 for details). Accordingly, the anti-invasive/metastatic effects of a VGSC blocker such as ranolazine can thus be enhanced when combined with other agents that associate with one or more other aspect(s) of the VGSC in this manner.

Before the present invention is described in greater detail, it is to be understood that this invention is not limited to particular aspects and embodiments described, and as such may, of course, vary. It is also to be understood that the terminology used herein is for the purpose of describing particular embodiments only, and is not intended to be limiting, since the scope of the present invention will be limited only by the appended claims. Unless defined otherwise, technical and scientific terms used herein have the same meaning as commonly understood by one of ordinary skill in the art to which this invention belongs.

ASPECTS AND EMBODIMENTS

The following provides more detail on certain aspects and embodiments according to the invention.

In a first aspect, there is provided a combination for use in a method of treating or preventing cancer in a subject, wherein the combination comprises
 a) a first substance which is capable of at least partially blocking the persistent part of voltage-gated sodium channel (VGSC) current while not completely blocking the transient part of VGSC current, and
 b) at least one second substance which is selected from a potassium channel opener, a non-VGSC sodium influx inhibitor and an upstream down-regulator of VGSC expression, or a combination comprising any two or more thereof.

In some embodiments according to the first aspect, one or more tumours in the subject express(es) a VGSC.

In some embodiments according to the first aspect, the VGSC is selected from Nav1.5, Nav1.7, Nav1.6, Nav1.2 and any combination of two or more thereof, optionally wherein one or more of the Nav1.5, Nav1.7, Nav1.6 and Nav1.2 are in neonatal form.

In some embodiments according to the first aspect, one or more tumours in the subject expresses neonatal Nav1.5 (nNav1.5).

In some embodiments according to the first aspect, the first substance is selected from the group consisting of ranolazine (N-(2,6-Dimethylphenyl)-4-[2-hydroxy-3-(2-methoxyphenoxy) propyl]-1-piperazineacetamide), eleclazine (4-(pyrimidin-2-ylmethyl)-7-(4-(trifluoromethoxy)phenyl)-3,4-dihydrobenzo[f][1,4]oxazepin-5 (2H)-one), GS-1655 (4-(pyrimidin-2-ylmethyl)-7-(4-(trifluoromethyl) phenyl)-3,4-dihydrobenzo[f][1,4]oxazepin-5 (2H)-one), and riluzole (6-(trifluoromethoxy)-2-benzothiazolamine), or a combination comprising any two or more thereof.

In some embodiments according to the first aspect, the first substance is ranolazine.

In some embodiments according to the first aspect, the combination comprises
 a) ranolazine and a potassium channel opener;
 b) ranolazine and a non-VGSC sodium influx inhibitor;
 c) ranolazine and an upstream down-regulator of VGSC expression;
 d) ranolazine, a potassium channel opener and a non-VGSC sodium influx inhibitor;
 e) ranolazine, a potassium channel opener and an upstream down-regulator of VGSC expression;
 f) ranolazine, a non-VGSC sodium influx inhibitor and an upstream down-regulator of VGSC expression; or
 g) ranolazine, a potassium channel opener, a non-VGSC sodium influx inhibitor and an upstream down-regulator of VGSC expression.

In some embodiments according to the first aspect, the at least second substance comprises a potassium channel opener selected from the group consisting of minoxidil, aprikalim, bimakalim, cromakalim, diazoxide, emakalim, levcromakalim, mazokalim, naminidil, nicorandil, pinacidil, pilmakalim, sarakalim, tolfenamic acid, lupirtine, retigabine, riluzole, NS1619, NS11021, benzo imidazolone 1-EBIO, rottlerin, retigabine, or a combination comprising any two or more thereof.

In some embodiments according to the first aspect, the potassium channel opener is selected from a $K_{ATP}$ opener, a $K_{Ca}$ opener and a Kv opener.

In some embodiments according to the first aspect, the at least one second substance comprises a sodium influx inhibitor selected from the group consisting of amiloride and digoxin, or a combination thereof.

In some embodiments according to the first aspect, the sodium influx inhibitor is an epithelial sodium channel (ENaC) blocker.

In some embodiments according to the first aspect, the at least one second substance comprises an upstream down-regulator of VGSC expression which is an EGFR kinase inhibitor selected from the group consisting of AG1478, gefitinib, erlotinib, afatinib, osimertinib, and dacomitinib, or a combination comprising any two or more thereof.

In some embodiments according to the first aspect, the combination comprises
 a) ranolazine and minoxidil;
 b) ranolazine and amiloride;
 c) ranolazine and AG1478;
 d) eleclazine and minoxidil;
 e) eleclazine and amiloride;
 f) eleclazine and AG1478;
 g) riluzole and minoxidil;
 h) riluzole and amiloride;
 i) riluzole and AG1478;
 j) GS-1655 and minoxidil;
 k) GS-1655 and amiloride;
 l) GS-1655 and AG1478; or
 m) ranolazine and riluzole.

In some embodiments according to the first aspect, the cancer is breast cancer, colon cancer, prostate, non-small cell lung cancer (NSCLC), mesothelioma, cervical cancer, stomach cancer, ovarian cancer, melanoma, oral squamous cell carcinoma, astrocytoma, neuroblastoma, or a combination of any thereof.

In some embodiments according to the first aspect, the combination prevents, reduces or inhibits metastatic behaviour of the cancer, invasiveness of the cancer, pain sensation in the subject, overall aggressiveness of the cancer, or a combination of any two or more thereof.

In some embodiments according to the first aspect, the first substance is administered in an amount effective to at least partially block the persistent part of VGSC current without completely blocking the transient part of the VGSC current.

In some embodiments according to the first aspect, the first substance essentially blocks the persistent part of the VGSC current.

In some embodiments according to the first aspect, wherein the first substance and at least one second substance are administered separately, sequentially or simultaneously to the subject.

In a Second Aspect, there is Provided a Kit-of-Parts Comprising
- a) a first substance which is capable of at least partially blocking the persistent part of a voltage-gated sodium channel (VGSC) current while not completely blocking the transient part of VGSC current, and
- b) at least one second substance which is selected from a potassium channel opener, a non-VGSC sodium influx inhibitor and an upstream down-regulator of VGSC expression, or comprises a combination of any two or more thereof;
for separate, sequential or simultaneous use in a method of treating or preventing cancer in a subject.

In a third aspect, there is provided a method of treating or preventing cancer in a subject, comprising administering to the subject
- a) a first substance which is capable of at least partially blocking the persistent part of a voltage-gated sodium channel (VGSC) current while not completely blocking the transient part of VGSC current, and
- b) at least one second substance which is selected from a potassium channel opener, a non-VGSC sodium influx inhibitor and an upstream down-regulator of VGSC expression, or comprises a combination of any two or more thereof.

In a fourth aspect, there is provided a pharmaceutical composition comprising as the active ingredients
- a) a first substance which is capable of at least partially blocking the persistent part of VGSC current while not completely blocking the transient part of VGSC current, and
- b) at least one second substance which is selected from a potassium channel opener, a non-VGSC sodium influx inhibitor and an upstream down-regulator of VGSC expression, or comprises a combination of any two or more thereof;
in admixture with a pharmaceutically acceptable carrier, diluent, vehicle, and/or excipient.

In some embodiments, the kit-of-parts according to the second aspect, the method according to the third aspect, or the pharmaceutical composition according to the fourth aspect, further comprises the features of any one or more of the embodiments of the first aspect.

The Following Numbered Embodiments are Also Provided:
1. A combination for use in a method of treating or preventing cancer in a subject, wherein the combination comprises
    - a) a substance capable of blocking the persistent part of voltage-gated sodium channel (VGSC) current while not blocking the transient part of VGSC current, and
    - b) a potassium channel opener; and wherein the substance and the potassium channel opener are administered separately, sequentially or simultaneously to the subject.
2. The combination for the use according to embodiment 1, wherein a primary tumour in the subject expresses a VGSC.
3. The combination for the use according to any one of the preceding embodiments, wherein the capable of blocking the persistent part of a VGSC current while not blocking the transient part of the VGSC current is selected from Nav1.5, Nav1.7, Nav1.6, Nav1.2 and any combination of two or more thereof, optionally wherein one or more of the Nav1.5, Nav1.7, Nav1.6 and Nav1.2 are in neonatal form.
4. The combination for the use according to embodiment 3, wherein the VGSC comprises neonatal Nav1.5 (nNav1.5).
5. The combination for the use according to any one of the preceding embodiments, wherein the substance capable of blocking the persistent part of a VGSC current while not blocking the transient part of VGSC current is selected from ranolazine (N-(2,6-Dimethylphenyl)-4-[2-hydroxy-3-(2-methoxyphenoxy) propyl]-1-piperazineacetamide), eleclazine (4-(pyrimidin-2-ylmethyl)-7-(4-(trifluoromethoxy)phenyl)-3,4-dihydrobenzo[f][1,4]oxazepin-5 (2H)-one), 4-(pyrimidin-2-ylmethyl)-7-(4-(trifluoromethyl)phenyl)-3,4-dihydrobenzo[f][1,4]oxazepin-5 (2H)-one, and riluzole (6-(Trifluoromethoxy)-2-benzothiazolamine), or a combination of any two or more thereof.
6. The combination for the use according to any one of the preceding embodiments, wherein the potassium channel opener is selected from the group consisting of minoxidil, amiloride, AG1478, aprikalim, bimakalim, cromakalim, diazoxide, emakalim, levcromakalim, mazokalim, naminidil, nicorandil, pinacidil, rilmakalim, sarakalim, flufenamic acid, meclofenamic acid, niflumic acid, nimesulide, rottlerin (mallotoxin), tolfenamic acid, flupirtine, retigabine, and riluzole, or a combination of any two or more thereof.
7. The combination for the use according to any one of the preceding embodiments, wherein the potassium channel opener is selected from minoxidil, amiloride, AG1478, and a combination of any two or more thereof.
8. The combination for the use according to any one of the preceding embodiments, wherein the combination comprises:
ranolazine and minoxidil;
ranolazine and amiloride;
ranolazine and AG1478;
eleclazine and minoxidil;
eleclazine and amiloride;
eleclazine and AG1478;
riluzole and minoxidil;
riluzole and amiloride;
riluzole and AG1478;
4-(pyrimidin-2-ylmethyl)-7-(4-(trifluoromethyl)phenyl)-3,4-dihydrobenzo[f][1,4]oxazepin-5 (2H)-one and minoxidil;
4-(pyrimidin-2-ylmethyl)-7-(4-(trifluoromethyl)phenyl)-3,4-dihydrobenzo[f][1,4]oxazepin-5 (2H)-one and amiloride;
4-(pyrimidin-2-ylmethyl)-7-(4-(trifluoromethyl)phenyl)-3,4-dihydrobenzo[f][1,4]oxazepin-5 (2H)-one and AG1478; or
ranolazine and rizuole.
9. The combination for the use according to any one of the preceding embodiments, wherein the cancer is breast cancer, colon cancer, prostate, non-small cell lung cancer (NSCLC), mesothelioma, cervical cancer, stomach cancer, ovarian cancer, melanoma, oral squamous cell carcinoma, astrocytoma, neuroblastoma, or a combination thereof.
10. The combination for the use according to any one of the preceding embodiments, wherein the combination prevents, reduces or inhibits metastatic behaviour of the cancer, invasiveness of the cancer, pain sensation in the subject, overall aggressiveness of the cancer, or any combination thereof.
11. The combination for the use according to any one of the preceding embodiments, where the substance is administered in an amount effective to at least partially block the persistent part of VGSC current without completely blocking the transient part of the VGSC current.
12. The combination for the use according to embodiment 10, wherein the substance essentially blocks the persistent part of the VGSC current.
13. A kit-of-parts comprising
    a) a substance capable of blocking the persistent part of a voltage-gated sodium channel (VGSC) current while not blocking the transient part of VGSC current, and
    b) a potassium channel opener, for separate, sequential or simultaneous use in a method of treating or preventing cancer in a subject.
14. A method of treating or preventing cancer in a subject, comprising separately, sequentially or simultaneously administering to the subject
    a) a substance capable of blocking the persistent part of a voltage-gated sodium channel (VGSC) current while not blocking the transient part of VGSC current, and
    b) a potassium channel opener a VGSC blocker.
15. A pharmaceutical composition comprising as the active ingredients
    a) a substance capable of blocking the persistent part of VGSC current while not blocking the transient part of VGSC current, and
    b a potassium channel opener,
    in admixture with a pharmaceutically acceptable carrier, diluent, vehicle, and/or excipient.
16. The kit-of-parts according to embodiment 13, the method according to embodiment 14, or the pharmaceutical composition according to embodiment 15, further comprising the features of any one of embodiments 1 to 12.

Accordingly, a combination of a first and at least one second substance according to any aspect or embodiment as described herein may be used as a medicament, e.g., for treatment of cancer. Suitable patients include mammalian patients, such as humans, monkeys, rabbits, dogs, cats, cows, horses, pigs, mice and rats, suffering from cancer. Preferably, the patient is a human patient, such as an adult human patient. Preferably, the combination of a first and a second substance according to any aspect or embodiment as described herein is synergistic.

The first substance of the combination is a VGSC blocker, preferably a VGSC blocker which is capable of at least partially blocking the persistent part of voltage-gated sodium channel (VGSC) current while not completely blocking the transient part of VGSC current.

As used herein, "voltage-gated sodium channels" or "VGSCs" refer to a class of integral membrane proteins which form ion channels. They conduct sodium ions ($Na^+$) through a cell's plasma membrane into cells. In humans, there are nine different VGSC alpha subunit or "Nav" proteins (Nav1.1 to Nav1.9), which are encoded by nine genes (SCN1A, SCN2A, SCN3A, SCN4A, SCN5A, SCN8A, SCN9A, SCN10A, and SCN11A, respectively). As used herein, unless contradicted by context, the term may refer to any and all known VGSCs.

As used herein, "Nav1.5" refers to the human Nav1.5 protein (in adult or neonatal form) encoded by the SCN5A gene (Genbank Gene ID: 6331). Unless contradicted by context, the term Nav1.5 as used herein is intended to encompass any and all forms of Nav1.5 that are expressed on cells (such as cancer cells), including neonatal Nav1.5 (also referred herein as "nNav1.5" or the "foetal" form of Nav1.5) or other splice variants or mutants known in the art, such as the splice variants and mutants described in the UniProtKB entry Q14524 (SCN5A_HUMAN). Referring to FIGS. 1 and Q14524 (SCN5A_HUMAN), the amino acid sequence of a neonatal Nav1.5 protein differs from that of an adult Nav1.5 protein in at least amino acid residue 211, and may differ also in other amino acid residues such as residues 206, 207, 209, 210, 215, and 234. Preferably, in the neonatal form, the amino acid at position 211 is K (Lys). For example, the neonatal form may comprise amino acid residues V, S, N, I, K, L, and P in positions 206, 207, 209, 210, 211, 215, and 234 respectively, where the adult form comprises the amino acid residues T, T, F, V, D, V, and S in the same/corresponding positions. In one embodiment, in the neonatal variant, residues 206-211 are changed from TTEFVD→VSENIK, optionally wherein, in the neonatal variant, the amino acid residue at position 215 is changed from V→L and/or the amino acid residue at position 234 is changed from S→P. UniProtKB-H9KVD2 (H9KVD2_HUMAN) represents a specific example of a neonatal Nav1.5 amino acid sequence.

As used herein, "Nav1.7" refers to the human Nav1.7 protein (in adult or neonatal form) encoded by the SCN9A gene. Unless contradicted by context, the term Nav1.7 as used herein is intended to encompass any and all forms of Nav1.7 that are expressed on cells (such as cancer cells), including neonatal Nav1.7 (also referred herein as "nNav1.7" or the "foetal" form of Nav1.7) or other splice variants or mutants known in the art, such as the splice variants and mutants described in the UniProtKB entry Q15858 (SCN9A_HUMAN). FIG. 1 illustrates particular amino acid residues that typically differ between the neonatal and adult forms of Nav1.7 protein.

As used herein, "Nav1.6" refers to the human Nav1.6 protein (in adult or neonatal form) encoded by the SCN8A gene. Unless contradicted by context, the term Nav1.6 as used herein is intended to encompass any and all forms of Nav1.6 that are expressed on cells (such as cancer cells), including neonatal Nav1.6 (also referred herein as "nNav1.6" or the "foetal" form of Nav1.6) or other splice variants or mutants known in the art, such as the splice variants and mutants described in the UniProtKB entry Q9UQD0 (SCN8A_HUMAN). FIG. 1 illustrates particular amino acid residues that typically differ between the neonatal and adult forms of Nav1.6 protein.

As used herein, "Nav1.2" refers to the human Nav1.2 protein (in adult or neonatal form) encoded by the SCN2A gene. Unless contradicted by context, the term Nav1.2 as used herein is intended to encompass any and all forms of Nav1.2 that are expressed on cells (such as cancer cells), including neonatal Nav1.2 (also referred herein as "nNav1.2" or the "foetal" form of Nav1.2) or other splice variants or mutants known in the art, such as the splice variants and mutants described in the UniProtKB entry Q99250 (SCN2A_HUMAN).

As used herein, a "voltage-gated sodium channel blocker" or "VGSC blocker" refers to a substance capable of at least partially blocking the VGSC current, preferentially the persistent (late) part of the VGSC current. In some embodiments, a VGSC blocker is a substance capable of blocking the persistent part of VGSC current while not blocking the transient part of VGSC current. For example, in some embodiments, a VGSC blocker is a substance capable of at least partially blocking the persistent part of VGSC current while not completely blocking the transient part of VGSC current. A VGSC blocker may, for example, be capable of blocking at least about 20%, such as at least about 30%, such as at least about 40%, such at least about 50%, such as at least about 60%, such as at least about 70%, of the persistent current. Preferably, the VGSC blocker blocks no more than about 20%, such as no more than about 15%, such as no more than about 10%, such as no more than about 5%, such as no more than about 2% of the transient current, particularly when provided at a clinically relevant dosage. In a particular embodiment, the VGSC-blocker is a substance capable of blocking at least about 50% of the persistent current while not blocking more than about 5% of the transient current, e.g., in an in vitro assay, preferably at a clinically relevant concentration (see FIG. 2). Suitable assays for evaluating the capability of a substance to block the persistent and transient currents of a VGSC are known in the art; see, e.g., Antzelevitch C et al. Circulation (2004); 110:904-910.

Non-Limiting Examples of Suitable VGSC Blockers Include the Following:
Ranolazine (N-(2,6-Dimethylphenyl)-4-[2-hydroxy-3-(2-methoxyphenoxy) propyl]-1-piperazineacetamide)·
Eleclazine, (4-(pyrimidin-2-ylmethyl)-7-(4-(trifluoromethoxy)phenyl)-3,4-dihydrobenzo[f][1,4]oxazepin-5 (2H)-one)·
GS-1655 (4-(pyrimidin-2-ylmethyl)-7-(4-(trifluoromethyl)phenyl)-3,4-dihydrobenzo[f][1,4]oxazepin-5 (2H)-one)·
Riluzole (6-(Trifluoromethoxy)-2-benzothiazolamine)

In a particular embodiment, the (first) substance is ranolazine. For details on the use of ranolazine as a medicament, e.g., for treatment of cancer, see WO 2012/049440 A1.

The second substance of the combination can, for example, be a potassium channel opener, sodium influx inhibitor or upstream regulator of VGSC expression. Combinations comprising a VGSC blocker and two or more such second substances are also contemplated. So, in some embodiments, the combination comprises a VGSC blocker, a potassium channel opener and a sodium influx inhibitor. In some embodiments, the combination comprises a VGSC blocker, a potassium channel opener and an upstream regulator of VGSC expression. In some embodiments, the combination comprises a VGSC blocker, a sodium influx inhibitor and an upstream regulator of VGSC expression. A combination of a potassium channel opener, a sodium influx inhibitor and an upstream regulator of VGSC expression is also contemplated.

As used herein, a "potassium channel opener" refers to a substance capable of acting on a potassium channel to facilitate $K^+$ ion transmission through the channel, typically to allow the flow of potassium out of the cell. These agents may 'oppose' the activation of a VGSC, for example by hyperpolarizing the membrane potential, in turn resulting in suppression of the 'persistent current' ($I_{NaP}$). In some embodiments, the potassium channel opener facilitates ion transmission through ATP-sensitive potassium channels. ATP-sensitive potassium channels ($K_{ATP}$) are gated by intracellular nucleotides, ATP and ADP, and are found in a variety of tissues, including heart, pancreatic beta cells, skeletal muscles, smooth muscles, and the CNS. Particularly contemplated for the present invention are also potassium channels gated by $Ca^{2+}$ ($K_{Ca}$ channels) or voltage (Kv channels).

Non-Limiting Examples of Potassium Channel Openers Include the Following:
Minoxidil (6-(1-Piperidinyl)pyrimidine-2,4-diamine 3-oxide) ($K_{ATP}$ channel opener)
Aprikalim ($K_{ATP}$ channel opener)
Bimakalim ($K_{ATP}$ channel opener)
Cromakalim ($K_{ATP}$ channel opener)
Diazoxide ($K_{ATP}$ channel opener)
Emakalim ($K_{ATP}$ channel opener)
Levcromakalim ($K_{ATP}$ channel opener)
Mazokalim ($K_{ATP}$ channel opener)
Naminidil ($K_{ATP}$ channel opener)
Nicorandil ($K_{ATP}$ channel opener)
Pinacidil ($K_{ATP}$ channel opener)
Rilmakalim ($K_{ATP}$ channel opener)
Sarakalim ($K_{ATP}$ channel opener)
Tolfenamic acid ($K_{Ca}$ channel activator)
Lupirtin (Kv channel opener)
Retigabine (Kv channel opener)
Riluzole ($K_{Ca}$ channel activator)
NS1619 (1,3-Dihydro-1-[2-hydroxy-5-(trifluoromethyl)phenyl]-5-(trifluoromethyl)-2H-benzimidazol-2-one) ($K_{Ca}$ channel opener)
NS11021 (N'-[3,5-Bis(trifluoromethyl)phenyl]-N-[4-bromo-2-(2H-tetrazol-5-yl-phenyl]thiourea) ($K_{Ca}$ channel opener)
Benzo imidazolone 1-EBIO ($K_{Ca}$ channel opener).
Rottlerin (mallotoxin) (activator of $K_{Ca}$ and Kv11.1 channels)
Retigabine (KCNQ/Kv7 opener)

Particularly Contemplated Potassium Channel Openers Include the Following:
Minoxidil
Cromakalim
Levcromakalim
Diazoxide
NS1619
NS11021
Benzo imidazolone 1-EBIO, and
Retigabine In one specific embodiment, the potassium channel opener is a $K_{ATP}$ opener, e.g., selected from the group consisting of minoxidil, cromakali, levcromakalim, and diazoxide. In a particular embodiment, the potassium channel opener is minoxidil.

In another specific embodiment, the potassium channel opener is a $K_{Ca}$ opener, e.g., selected from NS1619, NS11021 and benzo imidazole 1-EBIO.

In another specific embodiment, the potassium channel opener is a KCNQ/Kv7 opener, e.g., retigabine.

In some embodiments, the potassium channel opener is not riluzole. For example, in any embodiment where the first substance is riluzole, riluzole is not the (only) second substance.

As used herein a "sodium influx inhibitor" refers to a substance capable of acting on one or more non-VGSC ion channels that permeate Na+ into cells so as to reduce the influx of sodium ions. A sodium influx inhibitor may thereby able to enhance the effect of VGSC-$I_{NaP}$ by increasing the impact on intracellular sodium ion levels. Non-limiting examples of such sodium channels include epithelial sodium channel (ENaC), transient receptor potential channel subtype M4 (TrpM4), ATP-activated "purinergic" receptor subtype 7 (P2RX7), and the $Na^+$—$K^+$ ATPase/pump. In a particular embodiment, the sodium influx inhibitor is an ENaC blocker, which herein refers to a molecule capable of acting on the ENaC to reduce sodium influx through the channel, which is voltage independent. ENaC is located in the apical membrane of polarized epithelial cells and is thereby commonly present in carcinomas. In another particular embodiment, the sodium influx inhibitor is a blocker of the $Na^+$—$K^+$ ATPase/pump, which herein refers to a molecule capable of acting on the $Na^+$—$K^+$ ATPase/pump so as to reduce the influx of sodium ions through the channel.

Non-limiting examples of sodium influx inhibitors include amiloride and digoxin (Lanoxin®).

In one specific embodiment, the sodium influx inhibitor is amiloride, an ENaC blocker known as a potassium-sparing diuretic.

In another specific embodiment, the sodium influx inhibitor is Digoxin (Lanoxin®), an inhibitor of the Na+—$K^+$ ATPase/pump.

As used herein, an "upstream downregulator of VGSC expression" refers to a substance capable of downregulating the VGSC expression level by acting on an upstream member of a pathway regulating VGSC expression. In one embodiment, the substance regulates growth factor receptor tyrosine kinases (TKs). TK inhibitors may thus synergize with $I_{NaP}$ blockers. Particularly contemplated are "EGFR kinase inhibitors" or "EGFR tyrosine kinase inhibitors" or EGFR-TK inhibitors", referring to a substance capable of inhibiting the tyrosine kinase activity of the epidermal growth factor receptor (EGFR).

Non-Limiting Examples of EGFR-TK Inhibitors Include
AG1478/Tyrphostin N-(3-chlorophenyl)-6,7-dimethoxy-4-quinazolinamine) or an analogue or derivative thereof
Gefitinib/Iressa®
Erlotinib/Tarceva®
Afatinib (Gilotrif)
Osimertinib (Tagrisso)
Dacomitinib (Vizimpro)

In one specific embodiment, the EGFR-TK inhibitor is AG1478. In another specific embodiment, the EGFR-TK inhibitor is gefitinib. In another specific embodiment, the EGFR-TK inhibitor is gefitinib. In another specific embodiment, the EGFR-TK inhibitor is afatinib. In another specific embodiment, the EGFR-TK inhibitor is osimertinib. In another specific embodiment, the EGFR-TK inhibitor is dacomitinib. In some embodiments, the EGFR-TK inhibitor is an analogues or derivative of AG1478, gefitinib, gefitinib, afatinib, osimertinib, or dacomitinib, e.g., of AG1478, such as Ko143 ([[(3S,6S,12aS)-1,2,3,4,6,7,12,12a-octahydro-9-methoxy-6-(2-methylpropyl)-1,4-dioxopyrazino[1',2': 1,6]pyrido[3,4-b]indole-3-propanoic acid 1,1-dimethylethyl ester]).

Another substance category contemplated for combination with a VGSC blocker as an at least second substance according to the present invention is inhibitors of mechanisms that are downstream to VGSC signalling. Non-limiting examples include:
Inhibitors of sodium-hydrogen exchanger (NHE1), e.g. carapolide.
Inhibitors of sodium-calcium exchanger (NCX), e.g. ORM-11372.

In some embodiments, the at least one second substance does not comprise propranolol.

In some embodiments of the methods of treatment described herein, each of the first and at least one second substance is administered in a therapeutically effective amount or dose. By "therapeutically effective amount", "therapeutically effective dose", it is intended an amount or dosage of each substance that, when administered in combination to a patient suffering from cancer, brings about a positive therapeutic response with respect to treatment of the patient, such as, e.g., reduction of metastatic behaviour of the cancer, prevention of metastatic behaviour of the cancer, reduction of pain, or the like.

So, each of the first and the at least one second substances is administered to the patient in a therapeutically effective amount for the intended purpose, and with a frequency and for a period of time determined by a trained physician. Estimates of effective dosages and in vivo half-lives for the individual substances encompassed by the invention can be made using conventional methodologies or based on in vivo testing using an appropriate animal model or knowledge from prior clinical use of the substance.

For example, the first substance, i.e., the VGSC blocker, is preferably administered to the patient at a dosage that at least reduces the persistent part of the VGSC current without completely blocking the transient part. In a particular embodiment, the VGSC blocker is administered at a dosage which does not prevent proliferation of the cancer's tumour cells or destroy the tumour. Suitable dosages of ranolazine and eleclazine can be found in WO 2018/146313 (Celex GmbH) and WO2012/049440 (Celex Oncology Ltd.), both of which are hereby incorporated by reference in their entireties.

A VGSC blocker may, for example, be administered at a dosage capable of blocking at least about 20%, such as at least about 30%, such as at least about 40%, such as at least about 50%, such at least about 60%, such as at least about 70%, of the persistent current. Preferably, the VGSC blocker is administered at a dosage that blocks no more than about 20%, such as no more than about 15%, such as no more than about 10%, such as no more than about 5%, such as no more than about 2% of the transient current, particularly when provided at a clinically relevant dosage. In a particular embodiment, the VGSC-blocker is administered at a dosage capable of blocking at least about 50% of the persistent current while not blocking more than about 5% of the transient current.

For example, in some embodiments, the VGSC blocker is ranolazine, and is administered to a patient in a dosage providing for a ranolazine concentration in plasma in the range of, e.g., from about 0.1 µM to about 100 µM, such as from about 0.5 µM to about 20 µM, such as from about 1 µM to about 10 µM, such as from about 2 µM to about 5 µM. In some embodiments, ranolazine is administered to a patient in a dosage providing for a ranolazine concentration in a tumor in the range of, e.g., from about 0.1 µM to about 100 µM, such as from about 0.5 µM to about 20 µM, such as from about 1 µM to about 10 µM, such as from about 2 µM to about 5 µM. In some embodiments, ranolazine is administered to a patient, e.g., a human adult, at a dosage of at least about 10 mg, such as at least about 20 mg, such as at least about 50 mg, such as at least about 100 mg, such as at least about 200 mg, such as at least about 400 mg, such as at least about 800 mg, such as at least about 1600 mg. In some embodiments, ranolazine is administered to the patient, e.g., an adult human patient, at a dosage of in the range of about 100 to about 1000 mg ranolazine, such as from about 375 mg to about 750 mg, e.g., 375 mg, 500 mg or 750 mg per single dose administered, optionally in a slow-release or prolonged-release formulation, e.g., twice per day, once per day, once per week, or once per month.

In some embodiments, the second substance is a potassium channel blocker, such as minoxidil, and is administered to a patient, e.g., a human adult, in a dosage of at least about 1 mg, such as at least about 2 mg, such as at least about 5 mg, such as at least about 10 mg, such as at least about 20 mg, such as at least about 50 mg, such as at least about 100 mg. In general, a suitable dosage will be in the range of about 1 mg to about 100 mg minoxidil, such as from about 2 mg to about 60 mg or from about 5 to about 40 mg per single dose administered, e.g., twice per day, once per day, once per week, or once per month.

In some embodiments, the second substance is an ENaC blocker, such as amiloride, and is administered to a patient, e.g., a human adult, in a dosage of at least about 1 mg, such as at least about 2 mg, such as at least about 3 mg, such as at least about 4 mg, such as at least about 5 mg, such as at least about 8 mg, such as at least about 10 mg. In general, a suitable dosage will be in the range of about 1 to about 10 mg amiloride, such as from about 2 to about 8 mg or from about 3 to about 5 mg per kg bodyweight per single dose administered, e.g., twice per day, once per day, once per week, or once per month.

In some embodiments, the second substance is an EGFR-TK inhibitor, such as, e.g., erlotinib, and is administered to a patient, e.g., a human adult, in a dosage of at least about 5 mg, such as at least about 10 mg, such as at least about 20 mg, such as at least about 50 mg, such as at least about 100 mg, such as at least about 150 mg. In general, a suitable dosage will be in the range of about 5 to about 150 mg AG1478 per kg bodyweight, such as from about 10 to about 100 mg or from about 20 to about 50 mg per single dose administered, e.g., twice per day, once per day, once per week, or once per month.

Suitable treatment regimens may comprise repeating the administration at least once, such as at daily, weekly or monthly intervals, typically until a therapeutic benefit or response is observed or is expected based on prior knowledge. Delivery vehicles for the first and/or second substances, including sustained-release formulations, may be employed as needed. Suitable dosage regimens can be envisioned and implemented by the skilled artisan, e.g., a physician.

Maintenance regimens are also contemplated. The phrase "maintenance regimen" or "maintenance period" refers to a therapeutic regimen (or the portion of a therapeutic regimen) that is used for the maintenance of a subject during treatment of an illness, e.g., to reduce the risk for metastases for long periods of time (months or years). A maintenance regimen may employ continuous therapy (e.g., administering a drug at a regular intervals, (e.g., weekly, monthly, yearly, etc.) or intermittent therapy (e.g., interrupted treatment, intermittent treatment, treatment at relapse, or treatment upon achievement of a particular predetermined criteria (e.g., pain, disease manifestation, etc.).

The VGSC blocker and the at least one second substance can be administered simultaneously, separately or sequentially to the subject.

In some embodiments, the VGSC blocker and the at least one second substance are administered simultaneously. As used herein, the term "simultaneous administration" refers to administration of the first and second substance at the same time or substantially at the same time, e.g., within 1 hour, within 30 minutes, within 15 minutes, within 10 minutes, within 5 minutes or less. Optionally, simultaneous administration may include administering the two substances by the same administration route. In some embodiments, simultaneous administration is achieved by administering a pharmaceutical composition which comprises both the first and the second substances.

In some embodiments, the VGSC blocker and the at least one second substance are administered separately. As used herein, the term "separate administration" refers to administration of the first and second substances at separate occasions and/or according to separate but overlapping dosage regimens. The first and second substances may thus be administered, in any order, more than one hour apart, more than one day apart, or more than two days apart. In some embodiments, separate administration of the first and second substances occurs within at most one month or within at most one week. Separate or similar administration routes may be used.

In some embodiments, the VGSC blocker and the at least one second substance are administered sequentially. As used herein, the term "sequential administration" refers to administration of the first and second substances at separate occasions in a predetermined order. The first and second substances may thus be administered, in the predetermined order, at least 5 minutes apart, at least 10 minutes apart, at least 15 minutes apart, at least 30 minutes apart, at least one hour apart, at least one day apart, or at least two days apart. In some embodiments, sequential administration of the first and second substances occurs within at most one month or within at most one week. Separate or similar administration routes may be used.

In some embodiments, the first and the at least one second substance are both administered within an interval such that both substances are at or above pharmacologically effective levels in the tumour and/or above predetermined levels in the blood, serum or a reference tissue. Typically, the pharmacologically effective levels in the tumour are predetermined or linked to a certain level in blood or serum.

Particularly contemplated for the combination treatment are cancer forms that express, or that are at least known to be linked to the expression of, one or more VGSCs and thereby metastatic behaviour. Table 1 below shows links that have been found between some particular cancer forms and their VGSC subtype(s) expression.

TABLE 1

VGSC subtype expression in human cancers. The prefix "n" denotes "neonatal" where demonstrated.

| Cancers | VGSC subtype(s) |
|---|---|
| Breast | nNav1.5 (and nNav1.7) |
| Colon | nNav1.5 |
| Prostate | (n)Nav1.7 (and Nav1.6) |
| NSCLC | Nav1.7 |
| Mesothelioma | Nav1.2, Nav1.6 and Nav1.7 |
| Cervical | (n)Nav1.6 |
| Stomach | Nav1.7 |
| Ovary | Nav1.5 |
| Melanoma | Nav1.5 |
| Oral squamous cell carcinoma | Nav1.5 |
| Astrocytoma | nNav1.5 |
| Neuroblastoma | nNav1.5 |

In some embodiments, the cancer comprises one or more tumours, e.g., a primary tumour, that comprise(s) cancer cells that express, or are known to be linked to the expression of, Nav1.5, Nav1.6, Nav1.7, Nav1.2, or a combination thereof, in adult and/or neonatal form.

In some embodiments, the cancer comprises one or more tumours, e.g., a primary tumour, that comprise(s) cancer cells that express, or are known to be linked to the expression of, Nav1.5, in adult or neonatal form.

In a specific embodiment, the cancer comprises one or more tumours, e.g., a primary tumour, that comprise(s) cancer cells that express, or are known to be linked to the expression of, neonatal Nav1.5.

As used herein, "treating" or "treatment" of a cancer includes, but is not limited to, reducing metastatic behaviour of a cancer, preventing metastatic behaviour of a cancer, reducing pain sensation, reducing the invasiveness of a cancer, reducing the overall aggressiveness of the cancer, or any combination thereof. So, in separate and specific embodiments, a method of treatment according to the invention may (i) reduce metastatic behaviour of the cancer, (ii) prevent metastatic behaviour of the cancer, (iii) reduce pain sensation in a patient suffering from the cancer, (iv) reduce the invasiveness of the cancer, or (v), and combination of two or more of (i) to (iv).

Progression of metastatic cancer, such as breast, colon and prostate cancer, is generally considered as comprising at least some of five main phases, as follows:

1. Genesis, namely the initial transformation of a normal cell into a cancer cell;
2. Proliferation, namely increase in the number of cancer cells to form a primary tumour of increasing size, typically with a smooth and well-defined surface;
3. Switching, during the genesis or proliferation phase, from a condition in which the cancer cells have no potential for invasive or metastatic behaviour to a condition in which they do, typically characterised by a dissolving and diffuse boundary of the cancer;
4. Detachment of cancer cells from the primary tumour followed by movement of those detached cells into surrounding regions of tissue within the same organ towards the circulation system;
5. Metastasis, namely the movement of the detached cells through the circulation (blood or lymph) to other organs to create secondary tumours in those other organs.

It should be noted, however, that metastasis may occur without an initial proliferative phase. In such cases, metastases may be found in a patient without an identifiable primary tumour.

By "reducing metastatic behaviour" of cancer, it is intended a reduction of any behaviour associated with the movement of detached cancer cells through the circulation (blood or lymph) to accumulate and/or create secondary tumours in other organs or locally invade surrounding tissues. Typically, the patient is in Phase 3, 4 or 5, such as in Phase 4 or 5. Reducing metastatic behaviour may, for example, include one or more of (i) reducing transcription, translation and/or expression of neonatal and/or adult VGSCs (e.g., Nav1.5) in cancer cells as compared to a control, typically reducing at neonatal Nav1.5 (nNav1.5); (ii) reducing cancer cell invasiveness; (iii) reduce peak VGSC current density in cancer cells; (iv) reduce the proportion of cancer cells demonstrating VGSC currents; (v) reducing cancer cell motility (e.g., reduced lateral motility), (vi) reducing cancer cell migration (e.g., transverse migration), and (vii) reducing the persistent part of the VGSC current without eliminating the transient part. The VGSC may, for example, be Nav1.5 (in adult and/or neonatal form), such as nNav1.5. "Motility" reflects the ability of the tumour cells to initially move to and through the basement membrane into the surrounding tissue; "invasiveness" of the cells reflects the ability of tumour cells which have entered the surrounding tissue to move through that tissue towards the circulation system; and "migration" reflects the ability of the tumour cells to migrate from that tissue into the circulatory system via the walls thereof.

By "preventing metastatic behaviour" of cancer, it is intended to refer prophylactic treatment of a cancer patient at risk for, but not yet diagnosed with, a metastatic disease, so as to prevent or reduce the risk for a metastatic behaviour of the cancer as described above. Typically, the patient is in Phase 1, 2 or 3. Preventing metastatic behaviour may, for example, include preventing or reducing the expression of a VGSC, e.g., one or more of Nav1.5 in adult and/or neonatal form, such as nNav1.5.

The term "benign state" as used herein refers to a tumour or cancer in Phase 1 or 2. As used herein, tumours may also or alternatively be characterized as being in a benign state if they (a) do not invade nearby tissue (invasiveness); (b) do not metastasize (spread) to other parts of the body; (c) tend to have clear boundaries; and/or (d) grow slowly.

The term "malignant state" herein refers to a tumour or cancer in Phase 3, 4 or 5.

By "reducing the overall aggressiveness of a cancer", it is intended a reduction of any behaviour associated with the progression of cancer, in quantitative or qualitative terms. In some embodiments, reducing the aggressiveness of a cancer refers to the reversal of a cancer in any one of Phase 3, 4 or 5 to a lower-number phase, including, but not limited to, from Phase 3 to Phase 2 or lower, from Phase 4 to Phase 3 or lower, and from Phase 5 to Phase 4 or lower. In some embodiments, reducing the aggressiveness of a cancer refers to the reversal of a cancer or tumour in a malignant state to a cancer or tumour in a benign state. In some embodiments, by "reducing the overall aggressiveness of a cancer", it is intended a reduction of a cancer to non-metastatic but not necessarily non-invasive state.

By "reducing the invasiveness of a cancer", it is intended a significant reduction of the invasiveness of the cancer cells under predetermined conditions, e.g., normoxic or hypoxic conditions. Examples of assays suitable to determine invasiveness are provided elsewhere herein (see, e.g., the section entitled "Functional characteristics"). A significant reduction of invasiveness includes, e.g., a reduction by at least about 10%, 20% or more, such as by at least 30%, 40%, 50%, 60%, 70% or 80% as compared to a control.

Cancers suitable for treatment according to the invention include, but are not limited to, breast cancer, colon cancer, prostate, non-small cell lung cancer (NSCLC), mesothelioma, cervical cancer, stomach cancer, ovarian cancer, melanoma, oral squamous cell carcinoma, astrocytoma, neuroblastoma, and a combination of any thereof. In some embodiments, the cancer is breast cancer, colorectal cancer, lung cancer, ovarian cancer, neuroblastoma, or a combination of any thereof. As used herein, colorectal cancer can in some embodiments be characterized as colon cancer or rectal cancer, typically depending on the tissue origin of the cancer. Unless contradicted by context, however, colorectal cancer and colon cancer may be used interchangeably. In one embodiment, the cancer is colorectal cancer, colon cancer, or both.

In a specific embodiment, the cancer is breast cancer.

In some embodiments, one or more tumours in the patient are hypoxic or are at risk for being hypoxic. In some embodiments, one or more tumours in the patient are expected or determined by the trained physician to be hypoxic. The presence of hypoxia can be determined by a variety of techniques known in the art, including, but not limited to, magnetic resonance imaging (MRI) (see, e.g., Abadjian et al., Adv Exp Med Biol. 2017; 1036:229-257) or staining a sample of tumour tissue with pimonidazole (see, e.g., Wilson and Hay, Nature Reviews Cancer 2011; 11:393-410).

A VGSC (e.g., nNav1.5) expressing cancer is typically in Phase 3, 4 or 5 as described above.

In one embodiment, the patient is in Phase 3, 4 or 5, such as in Phase 4 or 5. In one embodiment, the cancer is in Phase 1, 2, or 3, such as in Phase 1 or 2.

In one embodiment, the cancer is in Phase 3. A patient suffering from a cancer in Phase 3 has typically not been diagnosed with metastatic disease, but is at risk for metastatic behaviour of the cancer, i.e., progression to Phase 4 or 5. A patient suffering from a cancer in Phase 3 may thus be treated according to the invention to prevent metastatic behaviour of the cancer.

In one embodiment, the cancer is in Phase 4. A patient suffering from a cancer in Phase 4 may not have been diagnosed with metastatic disease, but the cancer has progressed towards metastatic behaviour. A patient suffering from a cancer in Phase 4 may thus be treated according to the invention to reduce metastatic behaviour of the cancer.

In one embodiment, the cancer is in Phase 5. A patient suffering from a cancer in phase 5 may have been diagnosed with metastatic disease, and the cancer is characterized by metastatic behaviour. A patient suffering from a cancer in Phase 5 may thus be treated according to the invention to reduce metastatic behaviour of the cancer.

In some embodiments, the patient may be suffering from a cancer associated with a risk for VGSC-expression and/or metastatic behaviour, but VGSC-expression (e.g., nNav1.5 expression) and/or metastatic behaviour has not yet been determined. Cancers that are prone to metastatic behaviour include, for example, colon cancer, breast cancer, lung cancer, and ovarian cancer. For example, an immunohistochemical analysis of a cancer cell-containing sample such as a tumour biopsy or blood sample obtained from the patient may have indicated that the tumour cells in the sample did not express the nNav1.5 or other VGSCs tested for. The cancer may thus be in Phase 1 or (more likely) in Phase 2.

In one embodiment, the cancer is in Phase 2. A patient suffering from a cancer in Phase 2 has typically not been diagnosed with metastatic disease, but is at risk for VGSC (e.g., nNav1.5) expression and metastatic behaviour of the cancer, i.e., progression to Phase 3, 4 or higher. A patient suffering from a cancer in phase 2 may thus be treated according to the invention to prevent nNav1.5-expression or metastatic behaviour of the cancer.

A patient suffering from a cancer in any one of Phase 1-5, such as in any one of Phase 2-5, may also suffer from pain caused by the cancer, e.g., by a primary tumour, and may thus be treated according to the invention to reduce pain sensation.

In one embodiment, when used in a method according to the invention, the combination reduces or prevents metastatic behaviour in nNav1.5-expressing cancer without killing the cancer cells.

In one embodiment, when used in a method according to the invention, the combination reduces or prevents metastatic behaviour in nNav1.5-expressing cancer without substantially affecting proliferation of the cancer cells.

In one embodiment, treatment of cancer cells with the combination results in cancer cell expression of Nav1.5 (determined, e.g., as mRNA levels, protein levels or plasma membrane levels) in neonatal form being significantly lower than that of a control, such as a predetermined control value, cancer cells not exposed to the combination or cancer cells exposed to a reference compound, e.g., the first or second substance. In one embodiment, treatment of cancer cells with the combination results in the invasiveness, motility and/or ability to migrate of cancer cells treated with the combination being significantly lower than that of a control, such as a predetermined control value, cancer cells not exposed to the combination or cancer cells treated with only the first or only the second substance.

Typically, the first substance and the at least one second substance are administered in the form of joint or separate compositions. Each can be formulated in a composition, typically a pharmaceutical composition, for administration by any suitable route to a subject, including, but not limited to, oral, buccal, sublabial, sublingual, rectal, intravenous, subcutaneous, intradermal, intramuscular, transdermal and intranasal administration and/or direct administration to a tumour, such as a primary tumour. In some embodiments, the VGSC blocker and the second substance, e.g., the potassium channel opener, are formulated in the same composition, typically a pharmaceutical composition, for administration by any suitable route to the patient.

The pharmaceutical compositions of the present invention can be administered in a number of ways depending upon whether local or systemic treatment is desired and upon the tumor or cancer to be treated. Sustained-release systems may also be used, particularly so as to release the substance(s) over a prolonged period of time. Delivery can also be performed by local (e.g., intra-tumoral) or systemic administration of a composition, such as a pharmaceutical composition, comprising the VGSC blocker and/or the second substance, e.g., the potassium channel opener, to a subject.

The subject is typically a patient, preferably a human patient, such as a human cancer patient or a human subject at risk for cancer, particularly a cancer associated with VGSC expression. In some embodiments, the cancer patient has one or more tumours, e.g., a primary tumour, with metastatic and/or invasive behaviour. In some embodiments, the cancer patient has one or more tumours, e.g., a primary tumour, at risk for metastatic and/or invasive behaviour. Particularly contemplated for cancer treatment according to the present invention are human cancer patients.

In some embodiments, a treatment method as described herein comprises a step of testing whether the cancer or one or more tumours, e.g., a primary tumour, comprises cells expressing a VGSC, optionally in neonatal form, such as neonatal Nav1.5, Nav1.6 and/or Nav1.7. This step can be conducted prior to administering the VGCS blocker, optionally also prior to administering the potassium channel blocker. A sample can, for example, be taken from a tumour in the subject contemplated for treatment, e.g., via a tumour biopsy, and the tumour sample or tumour cells be analysed for the relevant VGSC mRNA(s), expression of the VGSC protein(s), or both.

In some embodiments, the patient is suffering from a cancer comprising Nav1.5-expressing cancer cells. Such a cancer may, for example, be identified by immunohistochemical or analysis of a cancer cell-containing sample (such as a tumour biopsy or blood sample) obtained from the patient, using detectable monoclonal or polyclonal antibodies specific for nNav1.5, aNav1.5 or both to detect the expression of Nav1.5 by the cancer cells, or analysing the sample for the presence of Nav1.5 mRNA. In one embodiment, the cancer cells express both aNav1.5 and nNav1.5. In a specific embodiment, the cancer expresses Nav1.5 in adult and/or neonatal form, such as, e.g., neonatal Nav1.5. Preferably, the cancer cells express, at least predominantly, Nav1.5 in neonatal form. In a preferred embodiment, the treatment method comprises a step of determining that the cancer comprises cells expressing nNav1.5 prior to administering the first substance, second substance or both.

The invention is further illustrated by the following Examples, which should not be interpreted as limiting.

EXAMPLES

Example 1—Materials and Methods

This Example describes the materials and methods used in the experimental work reported in Examples 2 to 7.

Cell Culture:

Cells were cultured in in 60×15 mm dishes (Falcon®, Becton Dickinson, Oxford, UK) tissue culture dishes in Dulbecco's Modified Eagle Medium (DMEM) (Invitrogen, Paisley, UK), supplemented with 4 mmol/L L-Glutamine (Invitrogen) and 5% foetal bovine serum (FBS) (Invitrogen). For seeding, cells were treated with trypsin-EDTA (Sigma-Aldrich®, Dorset, UK) for 5-10 minutes in the incubator at 37° C.; FBS-supplemented DMEM was added after trypsinization to stop further reaction. Cell were pelleted by centrifugation for 1 minute at 1700 rpm and re-suspended in media. Suspension concentration was determined using a haemocytometer. Cells were left to settle overnight at 37° C., 5% $CO_2$ and 100% humidity in an incubator (Heraeus, Hanau, Germany) for 24 hr before pre-treatment with the given drug(s) for given times for following assays.

Pharmacology:
1. Tetrodotoxin (TTX) was obtained from Alomone Labs (Jerusalem, Israel) and used at a concentration of 10-20 µM to partially block the voltage-gated sodium channels (VGSCs) present. TTX served as a positive control as it is a well-known blocker of VGSCs.
2. AG1478 was obtained from Sigma-Aldrich (Dorset, UK) and used at a concentration of 10 µM. It was dissolved in 0.1% DMSO which was also used as the control solution.
3. Ranolazine was obtained from Sigma-Aldrich (Dorset, UK). Four concentrations of ranolazine were used: 0.625, 1.25, 2.5 and 5 µM.
4. Minoxidil was obtained from Alfa Aesar™ (Thermo Fisher Scientific, UK). Three concentrations of minoxidil were used: 2.5, 5 and 5 µM, except for one early immunocyto-chemistry experiment which used 50 µM. It was dissolved in 2.5% DMSO which was also used as the corresponding control solution.

Experiments were designed in sets (i.e. cells were treated with the pharmacological agents and their combinations in parallel) to enable direct comparison and statistical analyses. In all cases, cells were pre-treated with given agent(s) for 24 hr before functional assays started (with the given treatment continued for the whole duration of the assay).

Ranolazine (2 mM) and minoxidil (31 mM) stock solutions were prepared by dissolving the drugs in DMEM and 100% dimethyl sulfoxide (Sigma-Aldrich), respectively, and frozen at −20° C. until use. Control solutions for minoxidil and combined treatment were made up by substituting minoxidil with the final concentration of DMSO. Fresh solutions were made at desired concentrations by dilution in DMEM and warmed to 37° C. prior to each experiment.

Treatments were either short-term/acute or long-term/48 hr (functional assays). Incubations under normoxia were undertaken in a humidified chamber whilst incubations under hypoxia (37° C., 5% $CO_2$, 100% humidity and 1% $O_2$) were undertaken in a hypoxia chamber (Micro Galaxy, RS Biotech Laboratory Equipment Ltd, Irvine, UK).

Cytotoxicity and Proliferation:

Cell viability was determined with the use of trypan blue dye exclusion assay. The assay was undertaken both in normoxic and hypoxic conditions. Upon completion of the treatment period, the media was aspirated and replaced with 0.2 mL of 0.4% trypan blue (Sigma-Aldrich) and 0.8 mL of DMEM media. The dish was mixed and incubated for 10 min in the humidified chamber. The trypan blue solution was replaced with 1 mL of DMEM and the dishes were observed under an inverted microscope (ID 03, Zeiss) at 100× magnification under phase contrast. The MTT assay was used to assess cell metabolic activity by determining the level of NAD (P) H-dependent cellular oxidoreductase enzymes. Cells were seeded in 24 well plates (Becton Dickinson, Oxford, UK) at $2×10^4$ cells/well and were allowed to settle overnight before treatment. During the treatment, 500 µL of solution was added to each well and the assays were undertaken in both normoxic and hypoxic conditions. Upon treatment completion, 400 µL of DMEM and 100 µL of MTT was added into each well. The plates were incubated for 3 h at 37° C. in normoxic conditions. The MTT solution was aspirated and replaced with 500 µL of DMSO and 75 µL of Sorenson's glycine buffer. The plates were rocked at 150 cycles/min for 5 min to mix the formazan with DMSO and the resulting formazan absorbance was measured at 570 nm with a multi-plate reader (ELX800 Universal Microplate Reader, Bio-Tek Instruments, UK). Two measurements for each result were recorded with a 5 min interval and the average was calculated. A standard curve which shows the linear relationship between cell number and absorbance value was plotted and raw absorbance values were used for future analysis.

Matrigel Invasion:

Cells were first seeded in 35×10 mm dishes (Becton Dickinson) at 5×10 cell/dish and left to settle overnight. The total treatment time is 48 h and cells were pre-treated with drugs before starting the assay. For MDA-MB-231 cell lines, the pre-treatment time is 36 h while for MDA-MB-468 cell lines, the pre-treatment time is 28 h. The Transwell filters (Beckton Dickinson) with 8 µm pores were placed in 24-well plates and coated with 50 mL Matrigel® (Becton Dickinson) diluted to 1.25 mg/mL from a 10 mg/mL stock with FBS-free DMEM. The Matrigel was left to solidify in the incubator overnight. After the period of pre-treatments, the inserts were hydrated with 500 µL FBS-free DMEM prior to seeding and incubated at 37° C. on the seeding day. Cells were trypsinized and resuspended in 1% FBS supplemented treatment solutions and were seeded at $2×10^4$ cells/insert in the upper chamber of inserts. A chemotactic gradient was created by adding 300 µL of 1% FBS supplemented solution to the upper chamber and 300 µL of 5% FBS supplemented solution to the lower chamber. The plates were incubated under hypoxic/normoxic condition, the FBS supplemented solutions in both chambers were aspirated and the upper part of the inserts was swabbed to remove non-invaded cells and Matrigel upon assay completion. Invaded cells were fixed with 300 µL ice-cold 100% methanol for 15 min and stained with 300 µL of 0.5 g/ml crystal violet diluted in 25% methanol for 15 min, both added to lower chambers. Inserts were subsequently washed with distilled water and left to dry before counting the invaded cells. Stained cells in 20 independent fields of view were counted with an inverted microscope under 400× magnification (Carl Zeiss, Hertfordshire, UK).

Immunocytochemistry:

Cells were first seeded in 35×10 mm dishes (Becton Dickinson) at $5×10^5$ cell/dish and left to settle overnight. The cells were pre-treated with treatment solutions for 32 h.

The assay was only performed under hypoxia conditions. Before seeding the cells, 13 mm coverslips were placed in 24 well plates and 500 μL poly-L-lysine (Sigma) was added to each well for 20 min. After the period of pre-treatments, cells were trypsinized and seeded at $2 \times 10^4$ cells/coverslip in 500 μL of their respective treatment solutions. The plates were incubated under hypoxic condition and the assay was allowed for 16 h. At least two coverslips were prepared for each experiment. Upon assay completion, the coverslips were washed with phosphate buffered saline (PBS) before being fixed with 500 μL of 4% paraformaldehyde (Sigma) diluted in PBS. Fixation was for 10 min at room temperature on an orbital shaker. Coverslips were then washed 3×5 min in PBS. One of the coverslips for each condition was permeabilised with 500 μL 0.1% saponin/PBS solution (Sigma) for 4 min and 3×5 min of PBS washes followed. Permeabilised and non-permeabilised coverslips were all were treated with 500 μL 5% bovine serum albumin (BSA)/PBS (pH 7.4, v/v; Dako, Cambridge, UK) blocking agent for 1 h. Coverslips were transferred from the 24 well plate to a humidity chamber and were incubated with 100 μL of the primary antibody (NESOpAb) at a 1:200 dilution of the 0.7 mg/mL stock on an orbital shaker overnight at 3-5° C. The primary antibody used was NESOpAb which can specifically recognize and bind an external epitope sequence of the neonatal isoform of Nav1.5 VGSC (nNav1.5) (Chioni et al., 2005). Coverslips were then rinsed with 3×5 min PBS and incubated with 100 μL of the secondary antibody, goat anti-rabbit IgG Alexa Fluor® 568, at a 1:100 concentration (Dako) for 1 h in darkness at room temperature. Coverslips for negative controls (which were incubated with secondary antibody only) were also prepared to check the specificity of the primary antibody. Coverslips were then rinsed with 3×5 min PBS+0.1% BSA and dipped in distilled water before being mounted on glass slides using mounting medium (Dako) and stored in darkness at 3-5° C. Images were taken with a Canon® digital camera inserted into an Axioimager immunofluorescence and phase contrast inverted microscope (Zeiss) and processed with Remote Capture Software® (Canon). ImageJ was used to analyse and quantify the corrected total cell florescence.

Electrophysiology:

Whole-cell patch clamp recordings are performed on cells under superfusion with mammalian physiological saline (MPS). Details of whole-cell recordings have been described previously (Fraser et al., 2003, 2005; Grimes et al., 1995; Laniado et al., 1997). In brief, MPS contains (in mM): 144 NaCl, 5.4 KCl, 1 $MgCl_2$, 2.5 $CaCl_2$), 5 HEPES and 5.6 D-glucose (adjusted to pH 7.3 with NaOH). Patch pipettes (tip resistances, ~5 MΩ) are filled with a solution designed to block the outward $K^+$ currents (in mM): NaCl 5, CsCl 145, $MgCl_2$ 2, $CaCl_2$) 1, HEPES 10 and EGTA 11, adjusted to pH 7.4 with 1 M CsOH. The estimated intracellular free $Ca^{2+}$ concentration is ~15 nM (Laniado et al., 2001). A holding potential of −100 mV is applied. Standard voltage-clamp protocols are used to study the electrophysiological properties of the VGSC currents. Mainly the following characteristics are studied: peak current (and its density), current-voltage relationship (current normalized to peak), steady-state inactivation/"availability"=test current (I)/maximum current ($I_{max}$); recovery from inactivation=test current ($I_t$)/control current ($I_c$). For accurate determination of the acute effect of minoxidil on peak current block, only currents larger than 200 pA are used. Further details of the voltage-clamp protocols, data analysis and curve fitting have been published earlier (Onkal et al., 2008).

Data Analysis:

A minimum of three biological repeats, each consisting of at least 3 technical repeats, were undertaken. For invasion assays, a minimum of three biological repeats, each biological repeat consisting of 2 inserts were undertaken. Normality of data was checked with the Shapiro-Wilk W test. Parametric data were analysed with a Student's t-test and displayed via bar graph (showing means #standard errors of the mean). Non-parametric data was analysed using a Mann-Whitney U-test and was displayed via box plots (showing medians, interquartile range; 5% and 95% confidence intervals and outliers). Significant results are indicated as *(P<0.05), (P<0.01) or *(P<0.001).

Example 2—Combination of Ranolazine and Amiloride

This Example compares the effect of tetrodotoxin (TTX), ranolazine (5 μM), amiloride (100 μM) and a combination of ranolazine and amiloride (5 μM and 100 μM, respectively) on cell invasiveness under hypoxia (1% $O_2$), using the materials and methods described in Example 1. TTX (20 μM) was used as a positive control. The results are shown in FIG. 3.

Example 3—Combination of Ranolazine and Minoxidil

This Example compares the effect of ranolazine, minoxidil and combinations thereof on cell invasiveness under hypoxia or normoxia, using the materials and methods described in Example 1, particularly the Matrigel invasiveness assay.

FIG. 4 shows initial results.

Under hypoxia, minoxidil (50 μM and 5 μM) significantly reduced MDA-MB-231 cell invasion by 89% and 56%, respectively. Ranolazine (5 μM) reduced invasion by 42%, whilst combining it with 50 μM and 5 μM minoxidil resulted in 100% and 54% reduction (P<0.001 for all) (FIG. 5a). In addition, the 11% increase between the size of reduction for 50M minoxidil and the combination treatment was significant (P<0.05) but this was not so for 5 μM minoxidil treatment (FIG. 4a). Reducing minoxidil to 2.5 μM resulted in a significant reduction in invasion of 48%, whilst 5 μM ranolazine significantly reduced invasion by 43% and the combination treatment caused a significant 58% reduction (FIG. 4b; P<0.001 for all). Additionally, a significant enhancement was observed with the combination treatment compared to minoxidil alone (FIG. 5b; P<0.001).

Effects of reducing the concentration of ranolazine were also tested. 2.5 μM ranolazine significantly reduced invasion by 36%, 2.5 μM minoxidil significantly reduced invasion by 24%, and the combination treatment caused a significant 55% reduction (FIG. 6a; P<0.001 for all). The combination treatment produced a significant enhancement in comparison to ranolazine treatment alone (FIG. 6a; P<0.001). 1.25 μM ranolazine significantly reduced invasion by 32%, 2.5 μM minoxidil significantly reduced invasion by 41%, and the combination treatment caused a significant 71% reduction (FIG. 6b; P<0.001 for all). The combination treatment produced a significant enhancement in comparison to minoxidil treatment alone (FIG. 6b; P<0.001). Lastly, 0.625 μM ranolazine significantly reduced invasion by 24%, 2.5 μM minoxidil significantly reduced invasion by 42%, and the combination treatment caused a significant 53% reduction (FIG. 6c; P<0.001 for all). The combination treatment was not significantly different in comparison to minoxidil treatment alone (FIG. 6c).

Next, effects of the drugs were investigated under normoxia vs. hypoxia. Under hypoxia, 2.5 µM ranolazine significantly reduced invasion by 30% (P<0.001) but had no effect under normoxia (FIG. 7). 2.5 µM minoxidil significantly reduced invasion by 49% under hypoxia (FIG. 7a) and by 53% under normoxia (FIG. 7b; P<0.001 for both) but were not different to each other (P=0.49). Additionally, combination treatment caused a significant 56% reduction under hypoxia, a significant 57% reduction under normoxia (P<0.001 for both) and a significant enhancement was observed in comparison to minoxidil treatment under hypoxia (P<0.001) but not normoxia (P=0.89).

In a final set of experiments, the effects of ranolazine, minoxidil and combination treatment were also tested, under hypoxia, on an additional BCa cell line (MDA-MB-468) also known to express functional VGSC activity (Aydar et al., 2016). 2.5 µM ranolazine significantly reduced invasion by 33% (FIG. 8; P<0.01), whilst 2.5 µM minoxidil significantly reduced it by 44% (FIG. 8; P<0.001). The combination treatment caused a significant 55% reduction in invaded cells (FIG. 8; P<0.001) and this reduction was significantly larger than when compared to the minoxidil treatment (FIG. 8; P<0.001).

To Summarize:
- The results in FIGS. 5 & 6 show that the effect of ranolazine (RAN) is dose-dependent, right down to sub-clinical levels (625 nM), that minoxidil (MIN) is also anti-invasive, and that MIN potentiates the effect of RAN at all concentrations tested (p<0.001).
- The results in FIG. 7 show that the anti-invasive effect of ranolazine (RAN) is seen only under hypoxia, and are dose-dependent, right down to sub-clinical levels (625 nM), that MIN is also anti-invasive under both normoxia and hypoxia, and that the anti-invasive effect of RAN+MIN is greater than RAN alone under both normoxia and hypoxia.
- The results in FIG. 8 show that RAN also inhibits the invasiveness of MDA-MB-468 cells, that MIN is also anti-invasive, and that the anti-invasive effect of RAN+MIN is greater than RAN alone.

Example 4—Control Experiments

The methods used are described in Example 1.

PCRs on three cell lines (MBA-MD-231, MBA-MD-468 and mouse 4T1) confirmed that $K_{ATP}$ channel subunits K6.1, 6.2 and SUR1/2A/2B mRNAs were expressed in all cells.

The highest concentrations of ranolazine (5 µM), minoxidil (50 µM), used in the experiments, and their combinations had no effect on cell viability of either MDA-MB-231 or MDA-MB-468 cell lines under normoxia or hypoxia treatment over 48 h.

Similarly, the concentrations of the drugs used for the motility and invasion studies had no effect on growth of both MDA-MB-231 and MDA-MB-468 cell lines over 48 h.

Example 5—Effect on nNav1.5 Expression

This Example studies the effect on ranolazine, minoxidil and combinations thereof on nNav1.5 expression levels. See Example 1 for materials and methods.

Immunocytochemical staining for nNav1.5 protein was performed under both non-permeabilized and permeabilized conditions (FIGS. 9a and b, respectively). As expected, compared with non-permeabilized conditions, the fluorescence levels were significantly higher for both DMEM and DMSO controls, by 12% 48%, respectively (P<0.001 for both). This is consistent with the non-permeabilized condition detecting mainly the 'plasma membrane' expression whilst the permeabilized condition detected 'total' (i.e. both plasma membrane and intracellular nNav1.5 protein). Ranolazine (5 µM) significantly reduced nNav1.5 protein expression under both non-permeabilized and permeabilized conditions by 30% and 43%, respectively (P<0.001 for both). Minoxidil (50 µM) and the drug combination significantly reduced nNav1.5 expression in permeabilized cells by 49% and 37%, respectively (FIG. 9b; P<0.001 and P<0.01, respectively). In contrast, for non-permeabilized cells, neither minoxidil nor the drug combination had a significant effect (FIG. 9a; P=0.58 and P=0.18, respectively). In addition, the reduced effect of combination treatment on nNav1.5 expression was significant in non-permeabilized cells in comparison to ranolazine (FIG. 9a; P<0.05). However, there was no significant difference for the effect of the drug combination in permeabilized cells.

Example 6—Combination of AG1478 and TTX

This Example compares the effect of AG1478 (10 µM), TTX (10 µM) and combinations thereof on the invasiveness of the MDA-MB-231 cell line in normoxia. Control, 0.1% DMSO.

The results are shown in FIG. 10. Briefly, FIG. 10a shows typical microscopic views of the invaded cells under the 4 treatment conditions. Quantified data are shown in FIG. 10b where invasiveness is plotted normalized with respect to the control. TTX has a slight effect but this is not significant (the concentration was kept low so as not to obscure any compounded effect of the combination). AG1478 has a significant inhibitory effect on invasiveness. The combination of TTX and AG1478 is significantly greater than the individual effects of TTX or AG1478 (p=0.02 and 0.006, respectively).

Example 7—Electrophysiological Measurements

The results are shown in FIGS. 11 and 12. Briefly, short-term (acute) application of minoxidil (50 µM) had no effect on peak current (consistent with the lack of effect of minoxidil on plasma membrane nNav1.5 protein expression), but slowed the recovery time and shifted the steady-state inactivation to more hyperpolarised potentials, implying that VGSCs would be less likely to be active (FIG. 11). Following long-term (48 hour) treatment with 50 µM minoxidil (then washing off) VGSC characteristic showed no change, indicating that minoxidil has to be present for any effect to occur (FIG. 12).

LIST OF REFERENCES

Each reference cited in this application, including each reference listed below, is hereby specifically incorporated by reference in its entirety.

Antzelevitch C et al., Circulation 2004; 110:904-910.

Brackenbury, Channels (Austin) 2012; 6(5):352-61.

Campbell et al., J Cell Sci 2013; 126:4939-49.

Chioni et al., The International Journal of Biochemistry & Cell Biology, 42, pp. 346-358.

Diss et al., Prostate 2001; 48(3):165-78.

Diss et al., Prostate Cancer and Prostatic Diseases 2005; 8:266-273.

Djamgoz et al., Cancers 2009; 11(11):1675.
Fraser et al., Human Cancer Biology, 11(15), pp. 5381-5389.
Fraser et al., J Cell Physiol. 2003; 195:479-87.
Grimes et al., FEBS Lett 1995; 369:290-294.
Laniado et al., Am J Pathol. 1997; 150:1213-1221.
Laniado et al., The Prostate 2001; 46:262-274.
Lee et al., J Cell Physiol 2019; 234(12):23066-23081.
Onkal et al., J Cell Physiol. 2008; 216:716-726.
Roger et al., Front Pharmacol; 2015; 6:152 et seq.
Uysal-Onganer and Djamgoz, Mol Cancer. 2007; 6:76.
Djamgoz, *Biophysics of Cancer: Cellular Excitability ("CELEX") Hypothesis of Metastasis*. J Clin Exp Oncol 2014, S1
WO 2018/146313 (Celex GmbH)
WO 2012/049440 (Celex Oncology Ltd.)
US 2020/0123544 A1 (Celex Oncology Ltd.)

The invention claimed is:

1. A method of treating cancer in a subject, comprising administering to the subject
   a) Ranolazine
   b) Minoxidil
   wherein each of the ranolazine and minoxidil is administered in a therapeutically effective amount.

2. The method according to claim 1, wherein one or more tumours in the subject express(es) a VGSC.

3. The method according to claim 2, wherein the VGSC is selected from Nav1.5, Nav1.7, Nav1.6, Nav1.2 and any combination of two or more thereof.

4. The method according to claim 2, wherein one more tumours in the subject expresses neonatal Nav1.5 (nNav1.5).

5. The method according to claim 1, wherein the cancer is breast cancer, colon cancer, prostate, non-small cell lung cancer (NSCLC), mesothelioma, cervical cancer, stomach cancer, ovarian cancer, melanoma, oral squamous cell carcinoma, astrocytoma, neuroblastoma, or a combination of any thereof.

6. The method according to claim 1, wherein the combination prevents, reduces or inhibits metastatic behaviour of the cancer, invasiveness of the cancer, pain sensation in the subject, overall aggressiveness of the cancer, or a combination of any two or more thereof.

7. The method according to claim 1, wherein ranolazine is administered in an amount effective to at least partially block the persistent part of VGSC current without completely blocking the transient part of the VGSC current.

8. The method according to claim 7, wherein ranolazine essentially blocks the persistent part of the VGSC current.

9. The method according to claim 1, wherein ranolazine and minoxidil are administered separately to the subject.

10. A kit-of-parts comprising
a) ranolazine, and
b) minoxidil;
for separate, sequential or simultaneous use in a method of treating or preventing cancer in a subject.

11. A pharmaceutical composition comprising as the active ingredients
a) ranolazine, and
b) minoxidil;
in admixture with a pharmaceutically acceptable carrier, diluent, vehicle, and/or excipient.

12. The method according to claim 3, wherein one or more of the Nav1.5, Nav1.7, Nav1.6, and Nav1.2 are in neonatal form.

* * * * *